US012186953B2

United States Patent
Nakamura

(10) Patent No.: US 12,186,953 B2
(45) Date of Patent: Jan. 7, 2025

(54) MANUFACTURING METHOD AND INJECTION MOLDING SYSTEM

(71) Applicant: CANON KABUSHIKI KAISHA, Tokyo (JP)

(72) Inventor: Takashi Nakamura, Hanoi (VN)

(73) Assignee: Canon Kabushiki Kaisha, Tokyo (JP)

( * ) Notice: Subject to any disclaimer, the term of this patent is extended or adjusted under 35 U.S.C. 154(b) by 381 days.

(21) Appl. No.: 17/382,753

(22) Filed: Jul. 22, 2021

(65) Prior Publication Data

US 2021/0347099 A1 Nov. 11, 2021

Related U.S. Application Data

(63) Continuation of application No. 15/618,403, filed on Jun. 9, 2017, now Pat. No. 11,104,050.

(30) Foreign Application Priority Data

Jul. 7, 2016 (VN) .............................. 1-2016-02505

(51) Int. Cl.
 *B29C 45/33* (2006.01)
 *B29C 45/04* (2006.01)
 (Continued)

(52) U.S. Cl.
 CPC ............ *B29C 45/332* (2013.01); *B29C 45/04* (2013.01); *B29C 45/0408* (2013.01);
 (Continued)

(58) Field of Classification Search
 None
 See application file for complete search history.

(56) References Cited

U.S. PATENT DOCUMENTS 3,235,638 A 2/1966 Winstead ...................... 264/545
3,838,730 A * 10/1974 Nagaoka .............. B22D 11/168
 164/436
(Continued)

FOREIGN PATENT DOCUMENTS

DE 3720214 12/1987
DE 10261032 7/2003
(Continued)

OTHER PUBLICATIONS

Office Action dated Mar. 19, 2019 in counterpart German Application No. 10 2017 114 967.8.
(Continued)

*Primary Examiner* — Jacob T Minskey
*Assistant Examiner* — Caroline Beha
(74) *Attorney, Agent, or Firm* — Venable LLP

(57) ABSTRACT

A method including a first step of performing clamping of a mold, injection and dwelling in an injection molding machine, a second step of performing a conveyance and a cooling of the mold outside of the machine, and a third step of performing a conveyance of the mold into the machine, an opening of the mold and an ejection of a molded part in the machine. The second step is performed for a first mold, the third step and the next first step are performed for a second mold. The first mold is conveyed by a first conveyance apparatus which is arranged on one lateral side of the machine. The second mold is conveyed by a second conveyance apparatus which is arranged on the other lateral side and is independently driven from the first conveyance apparatus.

19 Claims, 13 Drawing Sheets

(51) Int. Cl.

| | | |
|---|---|---|
| *B29C 45/17* | (2006.01) | |
| *B29C 45/42* | (2006.01) | |
| *B29C 45/72* | (2006.01) | |
| *B29C 45/73* | (2006.01) | |
| *B29C 45/76* | (2006.01) | |
| *B29C 45/78* | (2006.01) | |
| *B29C 45/80* | (2006.01) | |
| B29C 45/66 | (2006.01) | |
| B29K 105/00 | (2006.01) | |

(52) U.S. Cl.
CPC .......... *B29C 45/1742* (2013.01); *B29C 45/72* (2013.01); *B29C 45/73* (2013.01); *B29C 45/7653* (2013.01); *B29C 45/78* (2013.01); *B29C 45/80* (2013.01); *B29C 45/42* (2013.01); B29C 45/661 (2013.01); B29C 2945/76013 (2013.01); B29C 2945/76224 (2013.01); B29C 2945/76531 (2013.01); B29C 2945/76568 (2013.01); B29C 2945/76732 (2013.01); B29K 2105/0067 (2013.01)

(56) References Cited

U.S. PATENT DOCUMENTS

| | | | | |
|---|---|---|---|---|
| 4,810,181 | A * | 3/1989 | Ozawa | B29C 45/641 425/589 |
| 4,867,668 | A | 9/1989 | Miyairi | 425/192 R |
| 5,332,382 | A | 7/1994 | Kasai et al. | 425/145 |
| 6,186,763 | B1 * | 2/2001 | Scanlan | F15B 15/261 425/451.2 |
| 6,636,153 | B1 | 10/2003 | Barton et al. | 340/680 |
| 7,553,439 | B1 * | 6/2009 | Hughes | B29C 45/1744 425/88 |
| 2001/0038866 | A1 | 11/2001 | Giacobbe | 425/526 |
| 2003/0138513 | A1 | 7/2003 | Matsuura et al. | B22D 17/22 |
| 2006/0172039 | A1 * | 8/2006 | Imai | B29C 45/64 425/595 |
| 2008/0061466 | A1 | 3/2008 | Cornwell et al. | 264/148 |
| 2008/0241300 | A1 | 10/2008 | Kasahara et al. | 425/144 |
| 2009/0085238 | A1 | 4/2009 | Kobayashi et al. | 264/40.5 |
| 2009/0169674 | A1 * | 7/2009 | Kimura | B29C 45/1742 425/595 |
| 2012/0241292 | A1 | 9/2012 | Fourney | 198/732 |
| 2014/0035199 | A1 | 2/2014 | Kotitschke et al. | B29C 45/04 |

FOREIGN PATENT DOCUMENTS

| | | | |
|---|---|---|---|
| DE | 20 2010 000469 U1 | 7/2010 | |
| DE | 20 2010 017589 U1 | 6/2012 | |
| JP | S62-273816 | 11/1987 | |
| JP | H05-024067 | 2/1993 | |
| JP | H07-186176 | 7/1995 | |
| JP | H07-119012 B2 | 12/1995 | |
| JP | H09-187853 | 7/1997 | |
| JP | 2002-254152 | 9/2002 | |
| JP | 2008-179061 | 8/2008 | |
| JP | 2011-104834 | 6/2011 | |
| JP | 2016-112771 | 6/2016 | |
| JP | 2016112771 A * | 6/2016 | |
| WO | WO-2007137957 A1 * | 12/2007 | ......... B29C 45/0408 |

OTHER PUBLICATIONS

Office Action dated Dec. 2, 2016 in counterpart Japanese Patent Application No. 2016-141691, together with English translation thereof.

Office Action dated Feb. 21, 2019 in counterpart German Application No. 10 2017 011294.6.

Office Action dated Jul. 10, 2023 in counterpart German Application No. 10 2017 011294.6, together with English translation thereof.

* cited by examiner

EX1

EX2

MANUFACTURING METHOD AND INJECTION MOLDING SYSTEM

This application is a continuation of application Ser. No. 15/618,403 filed Jun. 9, 2017, currently pending; and claims priority under 35 U.S.C. § 119 to Viet Nam (VN) Application No. 1-2016-02505 filed in Viet Nam on Jul. 7, 2016; and the contents of all of which are incorporated herein by reference as if set forth in full.

BACKGROUND OF THE INVENTION

Field of the Invention

The present invention relates to injection molding.

Description of the Related Art

In manufacturing of molded parts by an injection molding machine, an injection process of filling a resin into a mold after clamping, a dwelling process of pressing the resin into the mold at a high pressure in order to compensate for a volume decrease due to solidification of the resin, a cooling process of keeping the molded part in the mold until the resin is solidified, and an ejecting process of ejecting the molded part from the mold are performed repeatedly.

In this type of molding method, a method that uses two molds with one injection molding machine in order to enhance productivity is proposed. For example, Japanese patent publication No. H7-119012 discloses a system in which molded part ejecting apparatuses are arranged on both sides of an injection molding machine. In this system, in the injection molding machine, an injection process and a dwelling process can be performed on one mold, and a cooling process and an ejecting process can be performed by the ejecting apparatus outside of the injection molding machine on the other mold. So, a molding operation proceeds while alternating the two molds between the injection molding machine and the ejecting apparatus.

Generally, a mold is manufactured with a metal such as a steel material, and is a heavy object whose weight reaches from several kilograms to several tons. Also, for a mold, to manufacture a molded part without a problem such as a burr and whose dimensional precision is high, mold parts are manufactured at high dimensional precision, and combined, and therefore sufficient precision is required in a mold opening/closing mechanism. Accordingly, the opening/closing mechanism is often expensive.

In the system of Japanese patent publication No. H7-119012, because the molded part is ejected outside of the injection molding machine, it is necessary to provide a mold opening/closing mechanism for each ejecting apparatus. Also, it is necessary to provide a molded part ejecting mechanism for each ejecting apparatus. Accordingly, a plurality of mold opening/closing mechanisms and molded part ejecting mechanisms are necessary, and the cost of the system as a whole is expensive.

Also, while the system of Japanese patent publication No. H7-119012 is something that can enhance productivity compared to normal molding by executing cooling processing dividing between inside and outside of the injection molding machine, there is room for further improvement. For example, if the times for processes inside and outside of the injection molding machine are respectively assigned to be half that of the overall molding process, productivity will be maximized. However, in the system of Japanese patent publication No. H7-119012, because a cooling process and an ejecting process are performed outside of the injection molding machine, the processes outside of the injection molding machine tend to take a longer time than the processes in the injection molding machine, and there are cases in which a wait time of the injection molding machine becomes long. As a result, improvement of productivity on the whole is limited.

SUMMARY OF THE INVENTION

The present invention provides a technique for improving productivity while suppressing a manufacturing apparatus cost increase.

According to an aspect of the present invention, there is provided a method of manufacturing a molded part by one injection molding machine while alternating two molds, the method comprising: a first step of performing clamping of a mold, injection and dwelling in the injection molding machine; a second step of, after the first step, performing a conveyance of the mold outside of the injection molding machine and a cooling of the mold outside of the injection molding machine; and a third step of, after the second step, performing a conveyance of the mold into the injection molding machine, an opening of the mold and an ejection of a molded part in the injection molding machine, wherein the first to third steps are repeatedly performed, while the second step is performed for a first mold, the third step and the next first step are performed for a second mold, the first mold is conveyed by a first conveyance apparatus which is arranged on one lateral side of the injection molding machine, and the second mold is conveyed by a second conveyance apparatus which is arranged on the other lateral side of the injection molding machine and is independently driven from the first conveyance apparatus.

Further features of the present invention will become apparent from the following description of exemplary embodiments (with reference to the attached drawings).

DESCRIPTION OF THE EMBODIMENTS

First Embodiment

With reference to the drawings, an injection molding system according to an embodiment of the present invention will be explained. Note that the arrow symbols X and Y in each figure indicate horizontal directions that are orthogonal to each other, and the arrow symbol Z indicates a vertical (upright) direction.

<System Overview>

Figure 1:
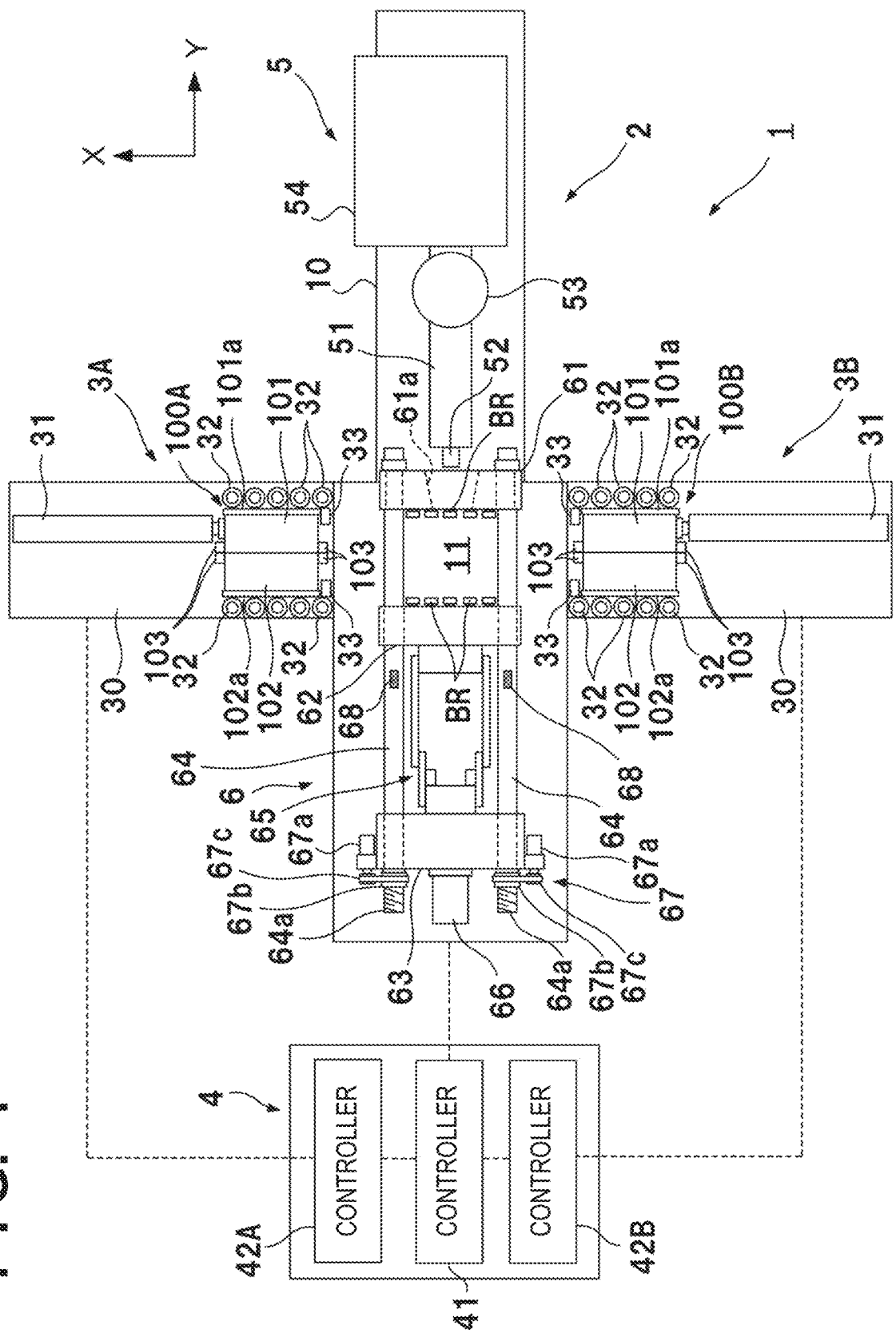
FIG. 1 is a plan view of an injection molding system according to an embodiment of the present invention.

FIG. 1 is a plan view of an injection molding system 1 according to an embodiment of the present invention. The injection molding system 1 is a system including a horizontal type injection molding machine 2, conveying machines 3A and 3B, and a control apparatus 4, and that is for manufacturing a molded part while alternating a plurality of molds by the conveying machines 3A and 3B for the one injection molding machine 2. In the embodiment, two molds 100A and 100B are used. There are cases where the molds 100A and 100B are referred to collectively as the molds 100.

The molds 100 are a pair of a fixed mold 101 and a movable mold 102 which is opened/closed in relation to the fixed mold 101. The molded part is molded by injecting a molten resin into a cavity formed between the fixed mold 101 and the movable mold 102. Clamping plates 101a and 102a are respectively fixed to the fixed mold 101 and the movable mold 102. The clamping plates 101a and 102a are used to lock the molds 100 to a molding operation position 11 (mold clamping position) of the injection molding machine.

For the molds 100, a self-closing unit 103 for maintaining a closed state between the fixed mold 101 and the movable mold 102 is arranged. By arranging the self-closing unit 103, it is possible to prevent the molds 100 opening after unloading the molds 100 from the injection molding machine 2. In a case of the embodiment, the self-closing unit 103 maintains the molds 100 in a closed state using a magnetic force. The self-closing unit 103 is arranged at a plurality of locations along opposing surfaces of the fixed mold 101 and the movable mold 102. The self-closing unit 103, in the embodiment, is a combination of an element on the side of the fixed mold 101, and an element on the side of the movable mold 102. The combination of these elements is a combination of magnetic materials such as a permanent magnet and iron, for example, or a pair of permanent magnets.

Note that as the self-closing unit 103, a mechanism using an elastic deformation such as a plastic, and a mechanism of a mechanical type manufactured by a metal and a spring can be used rather than a magnetic force, but using a magnetic force is advantageous on the point that it is possible to revert to the closed state when the mold is slightly opened. In other words, for this type of self-closing unit, because generally the closing force is small in relation to the clamping force of the clamping apparatus, there are cases in which the mold is slightly opened due to a resin pressure in the mold. At this time, with a self-closing unit that uses a magnetic force, it becomes possible to once again close the mold in conjunction with a reduction of resin pressure in the mold, even if the mold opens slightly. At this time, a state of adherence between the mold and the resin in the mold is maintained, stabilizing the quality of the molded part.

For the self-closing unit 103, two pairs or more, and advantageously four pairs may be installed for one of the molds 100. A pair of self-closing units may leave open a space of between 0.1 mm and several mm when the molds 100 are in the closed state. With this, a sudden change in the magnetic force when transitioning from the open state to the closed state is prevented, and it is possible to maintain a balanced closed state.

A conveying machine 3A loads and unloads the mold 100A onto/from the molding operation position 11 of the injection molding machine 2. A conveying machine 3B loads and unloads the mold 100B onto/from the molding operation position 11. The conveying machine 3A, the injection molding machine 2, and the conveying machine 3B are arranged to be lined up in that order in the X direction. In other words, the conveying machine 3A and the conveying machine 3B are arranged laterally with respect to the injection molding machine 2 so as to sandwich the injection molding machine 2 in the X direction. The conveying machines 3A and 3B are arranged to face each other, and the conveying machine 3A is arranged on one side laterally of the injection molding machine 2, and the conveying machine 3B is arranged on the other side respectively adjacent. The molding operation position 11 is positioned between the conveying machine 3A and the conveying machine 3B.

The conveying machines 3A and 3B respectively include a frame 30, a conveyance unit 31, a plurality of rollers 32, and a plurality of rollers 33. The conveying machines 3A and 3B may also be carts that convey the molds 100 in a factory.

The frame 30 configures a skeleton of the apparatus, and supports the conveyance unit 31, and the pluralities of rollers 32 and 33. The conveyance unit 31 is an apparatus that moves the molds 100 back and forth in the X direction, and that removes and inserts the molds 100 in relation to the molding operation position 11.

The conveyance unit 31, in the embodiment, is an electrically driven cylinder with a motor as a driving source, and includes a rod that moves forward/backward in relation to the cylinder; the cylinder is fixed to the frame 30, and the fixed mold 101 is fixed to the edge portion of the rod. For the conveyance unit 31 both a fluid actuator and an electric actuator can be used, and by using an electric actuator, it is possible to improve precision of control of the position or the speed when conveying the molds 100. The fluid actuator may be an oil hydraulic cylinder, or an air cylinder, for example. The electric actuator may, in addition to an electrically driven cylinder, be a rack-and-pinion mechanism with a motor as the driving source, a ball screw mechanism with a motor as the driving source or the like.

In the embodiment, the conveyance unit 31 is arranged independently for each of the conveying machines 3A and 3B. However, a common support member that supports the molds 100A and 100B may be used, and a single common conveyance unit 31 may be arranged for this support member. However, as in the embodiment, a case where the conveyance unit 31 is arranged independently for each of the conveying machines 3A and 3B is advantageous because it is possible to handle cases where the movement strokes differ between the mold 100A and the mold 100B when conveying (for example, a case in which the molds cannot be conveyed simultaneously since the widths of the mold (the width in the X direction) differ or the thickness of the molds (the width in the Y direction) differ).

The plurality rollers 32 configure a row of rollers arranged in the X direction, and in the embodiment, two rows are configured separated in the Y direction. The plurality of rollers 32 rotate around the axis of revolution in the Z direction, and guide movement in the X direction of the molds 100 contacting the side surfaces of the molds 100 (the side surfaces of the clamping plates 101a and 102a) and supporting the molds 100 from the side. The plurality rollers 33 configure a row of rollers arranged in the X direction, and in the embodiment, two rows are configured separated in the Y direction. The plurality of rollers 33 rotate around the axis of revolution in the Y direction, and cause movement in the X direction of the molds 100 to be smooth, supporting the bottom surfaces of the molds 100 (the bottom surfaces of the clamping plates 101a and 102a) and supporting the molds 100 from below.

The control apparatus 4 includes a controller 41 for controlling the injection molding machine 2, a controller 42A for controlling the conveying machine 3A, and a controller 42B for controlling the conveying machine 3B. Each of the controllers 41, 42A and 42B includes, for example, a processor such as a CPU, a RAM, a ROM, a storage device such as a hard disk, and interfaces connected to sensors or actuators. The processor executes programs stored in the storage device. An example of a program (control) that the controller 41 executes is explained later. The controller 41 is connected communicably with the controllers 42A and 42B, and makes instructions related to the conveyance of the molds 100 to the controllers 42A and 42B. The controllers 42A and 42B, if loading and unloading of the molds 100 terminates, transmit a signal for operation completion to the controller 41, and also transmit an emergency stop signal at a time of an abnormal occurrence to the controller 41.

In the embodiment, a controller is arranged for each of the injection molding machine 2 and the conveying machines 3A and 3B, but one controller may control these three apparatuses. Also, the conveying machine 3A and the conveying machine 3B may be controlled by a single controller for more reliable and collaborative operation. At least one controller is arranged for the injection molding machine 2, and by arranging one controller for the conveying machines 3A and 3B, the degree of freedom of the system is improved.

<Injection Molding Machine>

Figure 2:
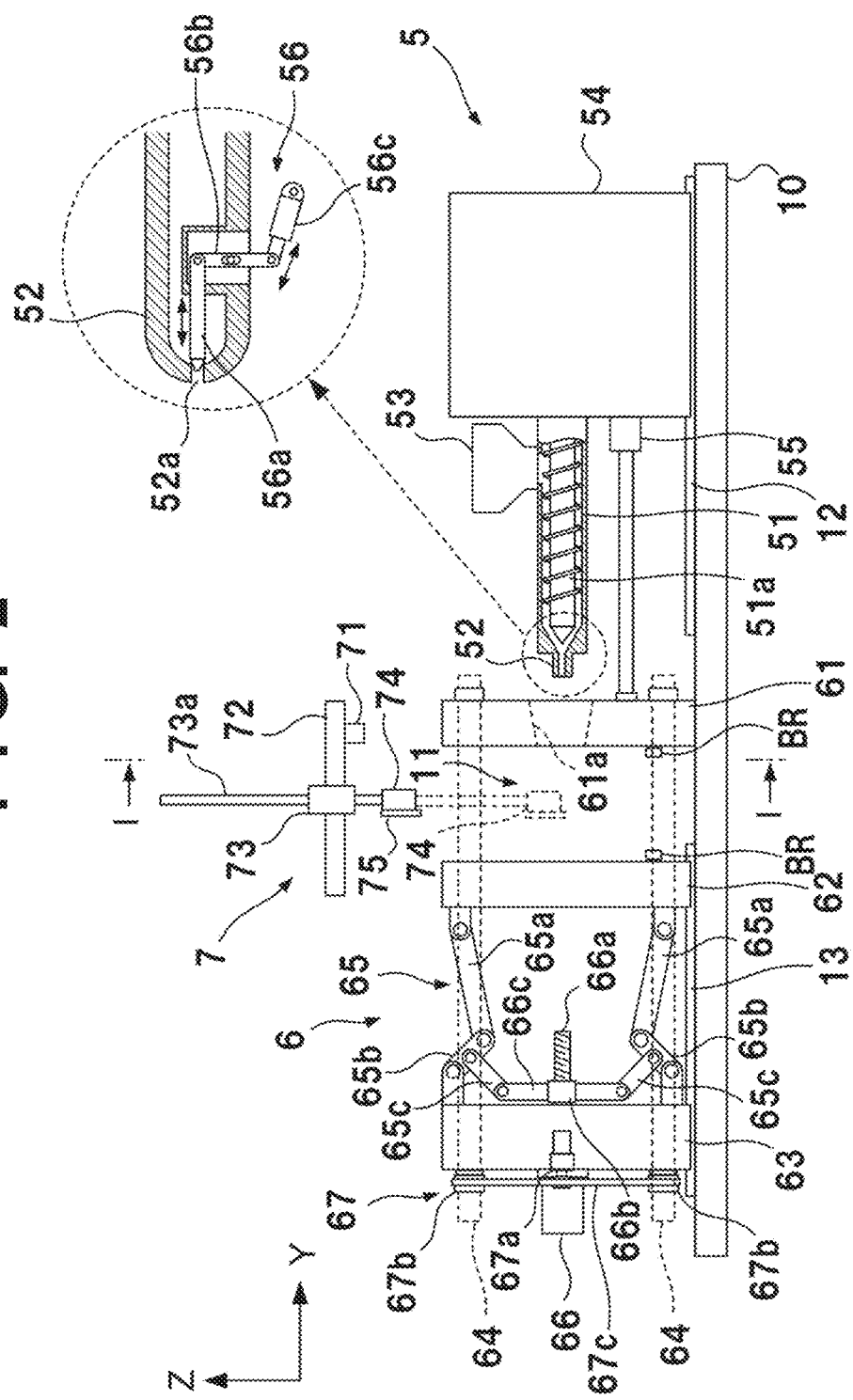
FIG. 2 is a side view of an injection molding machine.
Figure 3:
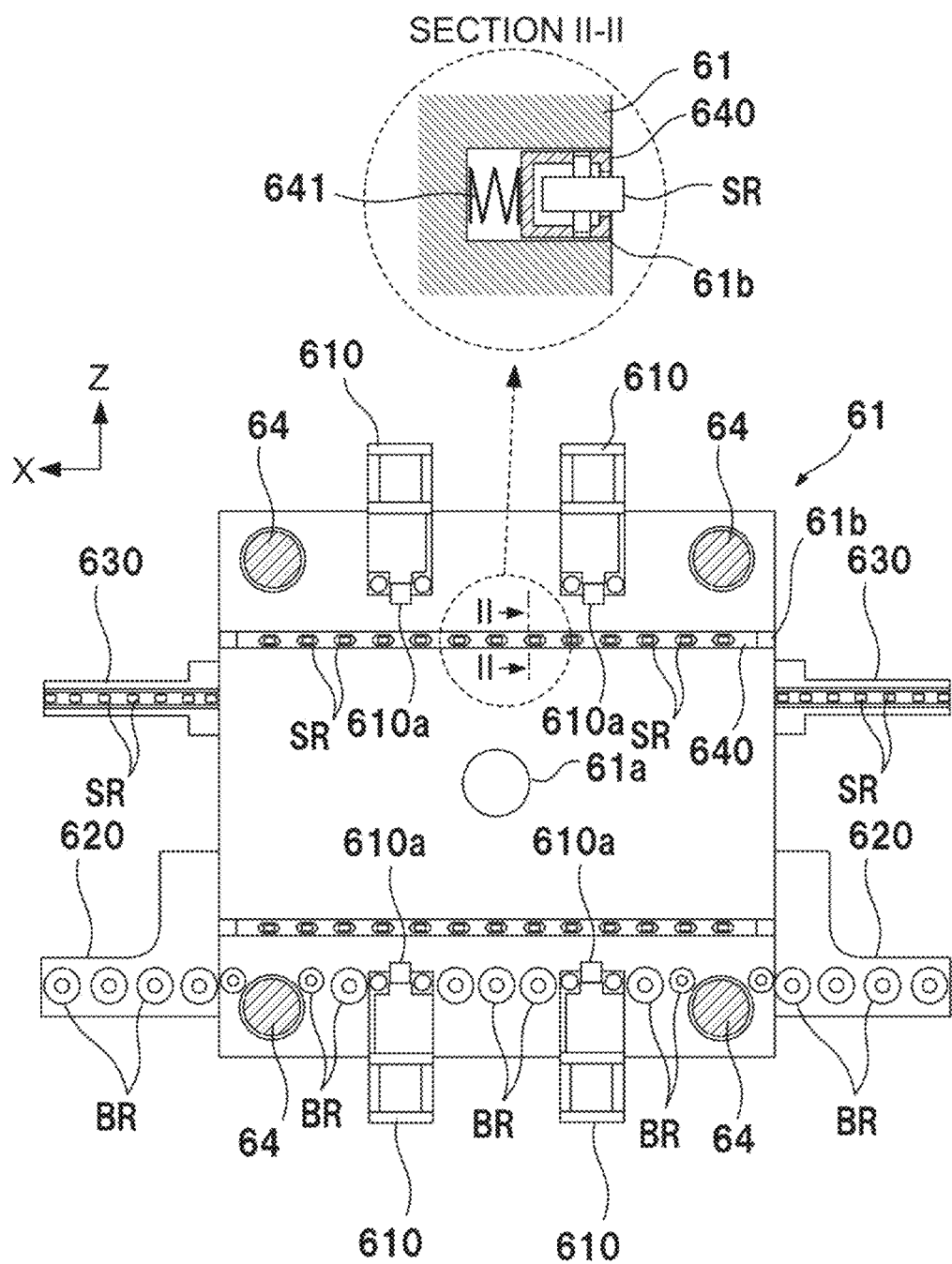
FIG. 3 is an end view of a fixed platen.
Figure 4:
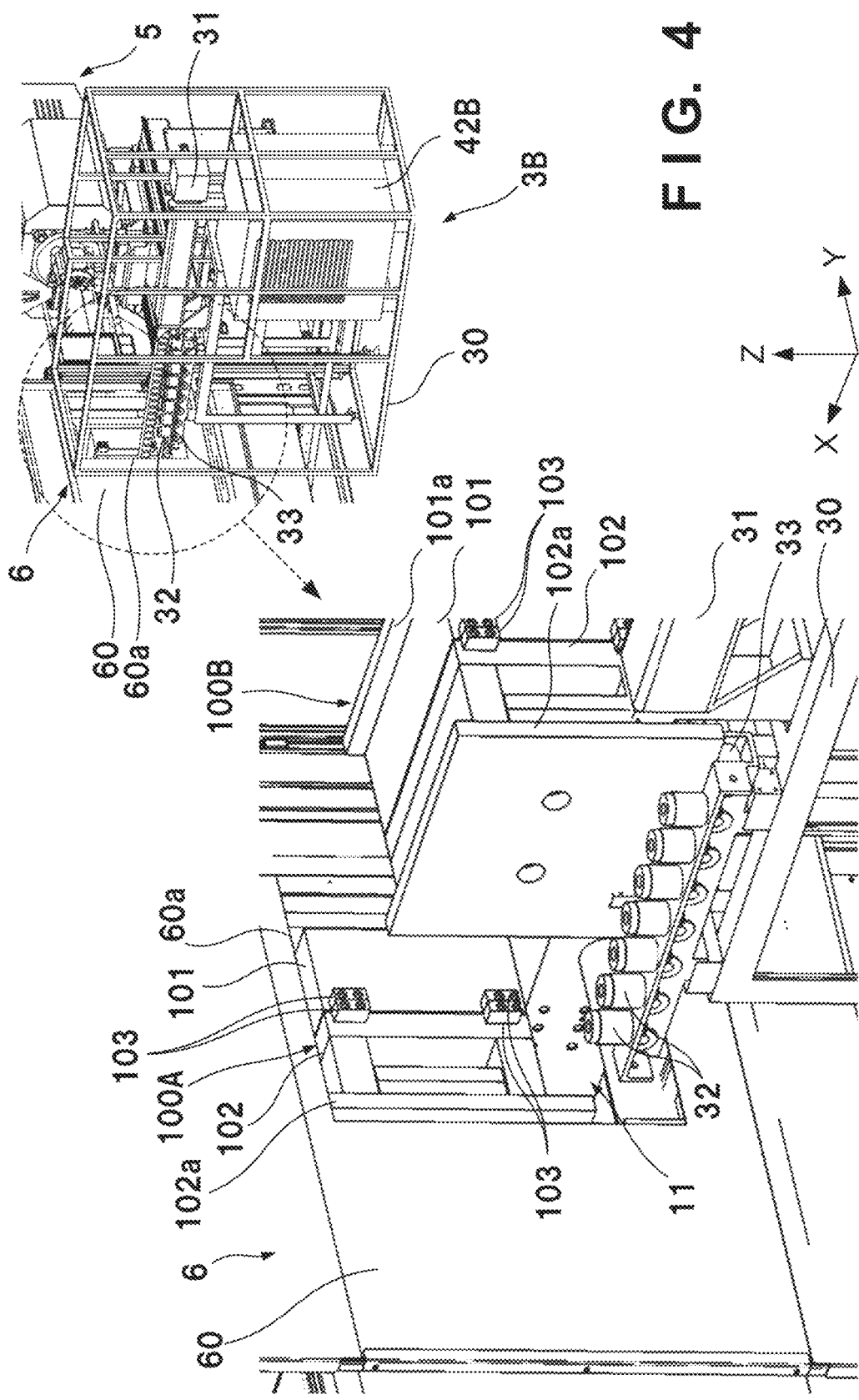
FIG. 4 is a partial perspective view of the injection molding system.

For the configuration of the injection molding machine 2, explanation is given with reference to FIG. 2-FIG. 4 in addition to FIG. 1. FIG. 2 is a side view of the injection molding machine 2. FIG. 3 is an end view of a fixed platen 61, and a figure viewing from the arrow direction of the I-I line in FIG. 2. FIG. 4 is a partial perspective view for describing the configuration of a periphery of the molding operation position 11.

With reference to FIG. 1 and FIG. 2, the injection molding machine 2 includes an injecting apparatus 5, a clamping apparatus 6, and a take-out robot 7 for ejecting a molded part. The injecting apparatus 5 and the clamping apparatus 6 are arranged on a frame 10 in the Y direction.

The injecting apparatus 5 includes an injection cylinder 51 which is arranged to extend in the Y direction. The injection cylinder 51 includes a heating device (not shown) such as a band heater, and melts a resin introduced from a hopper 53. A screw 51a is integrated into the injection cylinder 51, and by rotation of the screw 51a, plasticizing and measuring the resin introduced into the injection cylinder 51 are performed, and by movement in the axial direction (Y direction) of the screw 51a, it is possible to inject a molten resin from an injection nozzle 52.

As the nozzle 52, it is possible to use a shut-off nozzle capable of opening/closing a discharge port. In FIG. 2, an example of a shut-off nozzle is illustrated. For an opening/closing mechanism 56 of the same figure, a pin 56a for opening/closing the discharge port 52a is arranged. The pin 56a is connected with an actuator (a cylinder) 56c via a link 56b, and by the operation of the actuator 56c the discharge port 52a is opened and closed.

The injection cylinder 51 is supported by a driving unit 54. In the driving unit 54, a motor for plasticizing and measuring the resin by rotationally drive the screw 51a, and a motor for driving the screw 51a to move forward/backward in the axial direction are arranged. The driving unit 54 can move forward/backward in the Y direction along a rail 12 on the frame 10, and in the driving unit 54, an actuator (for example, an electrically driven cylinder) 55 for causing the injecting apparatus 5 on the whole to move forward/backward in the Y direction is arranged.

The clamping apparatus 6 is an apparatus for performing a clamping and opening and closing of the molds 100, and in the embodiment is a toggle type clamping apparatus. In the clamping apparatus 6, in order in the Y direction, the fixed platen 61, a movable platen 62, and a movable platen 63 are arranged. Through these platens 61 to 63 a plurality (here four) of tie-bars 64 pass. Each of the tie-bars 64 is an axis that extends in the Y direction, one end of which is fixed to the fixed platen 61. Each of the tie-bars 64 is inserted into a respective through hole formed in the movable platen 62. The other end of each of the tie-bars 64 is fixed to the movable platen 63 through an adjusting mechanism 67. The movable platens 62 and 63 can move in the Y direction along a rail 13 on the frame 10, and the fixed platen 61 is fixed to the frame 10.

A toggle mechanism 65 is arranged between the movable platen 62 and the movable platen 63. The toggle mechanism 65 causes the movable platen 62 to move forward/backward in the Y direction in relation to the movable platen 63 (in other words, in relation to the fixed platen 61). The toggle mechanism 65 includes links 65a to 65c. The link 65a is connected rotatably to the movable platen 62. The link 65b is connected pivotably to the movable platen 63. The link 65a and the link 65b are connected pivotably to each other. The link 65c and the link 65b are connected pivotably to each other. The link 65c is connected pivotably to an arm 66c.

The arm 66c is fixed on a ball nut 66b. The ball nut 66b engages a ball screw shaft 66a which extends in the Y direction, and moves forward/backward in the Y direction by rotation of the ball screw shaft 66a. The ball screw shaft 66a is supported such that it is free to rotate by the movable platen 63, and a motor 66 is supported by the movable platen 63. The motor 66 rotationally drive the ball screw shaft 66a. The amount of rotation of the motor 66 is detected by a sensor (not shown) such as a rotary encoder. By driving the motor 66, while detecting the amount of rotation of the motor 66, it is possible to perform clamping and opening and closing of the molds 100.

The injection molding machine 2 includes sensors 68 for measuring a clamping force. In the embodiment, each sensor 68 is a strain gauge provided on the tie-bar 64, and calculates a clamping force by detecting a distortion of the tie-bar 64.

The adjusting mechanism 67, nuts 67b supported so as to freely rotate on the movable platen 63, motors 67a as driving sources, and transfer mechanisms (here belt transmission mechanisms) for transferring the driving force of the motors 67a to the nuts 67b. Each of the tie-bars 64 passes through a hole formed in the movable platen 63, and engages with the nut 67b. By causing the nuts 67b to rotate, the engagement positions in the Y direction between the nuts 67b and the tie-bars 64 change. That is, the position at which the movable platen 63 is fixed in relation to the tie-bar 64 changes. With this, it is possible to cause a space between the movable platen 63 and the fixed platen 61 to change, and thereby it is possible to adjust a clamping force or the like. Each amount of rotation of the motor 67*a* is detected by a sensor (not shown) such as a rotary encoder. By driving the motors 67*a* while detecting the amount of rotation of the motors 67*a*, it is possible to change the position at which the movable platen 63 is fixed in relation to the tie-bar 64 at a higher precision according to an arbitrarily position from the initial position.

The molding operation position 11 is a region between the fixed platen 61 and the movable platen 62. The molds 100 introduced into the molding operation position 11 are sandwiched between the fixed platen 61 and the movable platen 62 and thereby clamped. Also, opening and closing in accordance with movement of the movable mold 102 by movement of the movable platen 62 is performed.

With reference to FIG. 3, an opening portion 61*a* through which the nozzle 52 moves forward/backward is formed in a central portion of the fixed platen 61. To the surface on the side of the movable platen 62 (called an inner surface) of the fixed platen 61 a plurality of rollers BR are supported such that they are free to rotate. The plurality of rollers BR rotate around the axis of revolution in the Y direction, and cause movement in the X direction of the molds 100 to be smooth, supporting the bottom surfaces (the bottom surface of the clamping plate 101*a*) of the molds 100 and supporting the molds 100 from below. On both sides in the X direction of the fixed platen 61 a roller supporting body 620 is fixed, and the plurality of rollers BR are supported by the roller supporting body 620.

On the inner surface of the fixed platen 61 grooves 61*b* that extends in the X direction are formed. The grooves 61*b* are formed in two rows separated vertically. On each of the grooves 61*b* a roller unit 640 is arranged. For the roller unit 640, a plurality of rollers SR are supported such that they are free to rotate. The plurality of rollers SR rotate around the axis of revolution in the Z direction, and guide movement in the X direction of the molds 100 contacting the outer surfaces of the molds 100 (the outer surface of the clamping plate 101*a*) and supporting the molds 100 from the side. As illustrated in the cross sectional view of the line II-II, while the roller unit 640, by a bias of a spring 641, is positioned at a position at which the roller SR protrudes from the groove 61*b*, at a time of clamping it is retracted in the groove 61*b*, and positioned at a position at which the roller SR does not protrude from the groove 61*b*. The roller unit 640 can prevent the inner surfaces of the molds 100 and the fixed platen 61 from contacting and damaging the inner surfaces at a time of alternating the molds 100, and the roller unit 640 does not impede the inner surface of the fixed platen 61 and the molds 100 being close at a time of clamping.

On both sides in the X direction of the fixed platen 61, a roller supporting body 630 is fixed, and a plurality of rollers SR are supported by the roller supporting body 630.

By these rollers BR and rollers SR, it is possible to convey the molds 100 at a higher speed and more smoothly when conveying the molds 100 between the injection molding machine 2 and the conveying machines 3A or 3B.

On the fixed platen 61, a plurality of fixing mechanisms (clamps) 610 are arranged for fixing the fixed mold 101 to the fixed platen 61. Each clamp 610 includes an engaging portion 610*a* that engages with the clamping plate 101*a*, and a built-in actuator (not shown) that moves the engaging portion 610*a* between an engagement position and an engagement release position. The actuator is a fluid actuator such as an oil pressure actuator or an air actuator. As a mechanism for fixing a mold, an electromagnetic clamp may be used. The electromagnetic clamp, by causing current to flow in a coil can magnetize and demagnetize a magnetic material in the inside of the coil in a relatively short time, and so it becomes possible to attach/release a mold. However, a fluid actuator is advantageous in the case of frequently alternating the molds 100.

In magnetization and demagnetization of the electromagnetic clamp, there is a problem in that generally when an electric charge stored in a large capacity condenser is momentarily caused to flow in a coil, the current that flows in the coil becomes very large, and the magnet and the coil gradually generate heat when repeated many times. Because the magnetic force of the magnet weakens when the temperature increases, and ultimately the magnetic force is lost, a situation in which the coil and the magnet add heat is not advantageous, and further there are cases in which conveyance of heat to the mold has an effect on the quality of the molded part. As a counter-measure there are methods of causing a cooling water to flow in the electromagnetic clamps, but this is disadvantageous from the perspective of a power consumption amount and an installation cost. Thus, a fluid actuator is advantageous in the case of frequently alternating the molds 100.

Note that for the movable platen 62, similarly to the fixed platen 61, a plurality of rollers BR, the roller supporting bodies 620 and 630, the roller unit 640, and the fixing mechanism 610 for fixing the movable mold 102 are arranged.

See FIG. 4. Generally, in the periphery of the clamping apparatus a safety door is arranged for safety, and upon a mold replacement, the safety door is opened to perform replacement work. However, in the embodiment, it is envisioned that alternation of the molds 100 is performed frequently, and so a configuration in which a safety door is opened and closed would be inconvenient.

In the embodiment, the periphery of the clamping apparatus 6 is surrounded by a cover (exterior covering plate) 60 for safety, but openings 60*a* through which the molds 100 pass are formed on the sides of the molding operation position 11 for alternating the molds 100. Each opening 60*a* is basically continuously open, and free removal and insertion of the molds 100 from and to the molding operation position 11 is possible. In each opening 60*a*, it is possible to arrange a slide door that opens/closes manually, and closes off the opening 60*a*. Then during preparation work such as replacing the molds 100 with another mold, the opening 60*a* may be closed by the slide door.

Also, in FIG. 4, an example of an outer appearance of the conveying machine 3B is illustrated. A safety door may be arranged on the frame 30, and the inside and outside of the frame 30 may be isolated. In the example of FIG. 4, the controller 42B is arranged on the lower portion of the conveying machine 3B, but the location at which each controller is arranged may be anywhere.

Returning to FIG. 2, the take-out robot 7 is explained. For ejection of a molded part, it is possible to employ a method in which a mold ejector pin is driven to automatically drop the molded part, or manual ejection by a worker, but in the embodiment, a mechanism in which the molded part is taken out from the opened movable mold 102 is assumed.

The take-out robot 7 includes a rail 71 that extends in the X direction, and a movable rail 72 which can move in the X direction on the rail 71. The movable rail 72 is arranged to extend in the Y direction, and a slider 73 is arranged on the movable rail 72. The slider 73 has a function for moving in the Y direction guided by the movable rail 72, and also has a function of moving up and down an elevating shaft 73*a* in the Z direction.

On a lower end of the elevating shaft 73*a* an vacuum head 74 is arranged, and on the vacuum head 74, a chuck plate 75 specialized to a molded part is mounted.

The take-out robot 7, after opening, moves the vacuum head 74 between the fixed mold 101 and the movable mold 102 as illustrated by broken lines in FIG. 2 by the rail 71, the movable rail 7, and the slider 73, sticks to the molded part, and conveys it to the exterior. Note that in the embodiment, a vacuum type take-out robot is exemplified as the take-out robot 7, but it is possible to employ a take-out robot of a type that grips the molded part mechanically.

<Molded Part Manufacturing Example>

Figure 5:
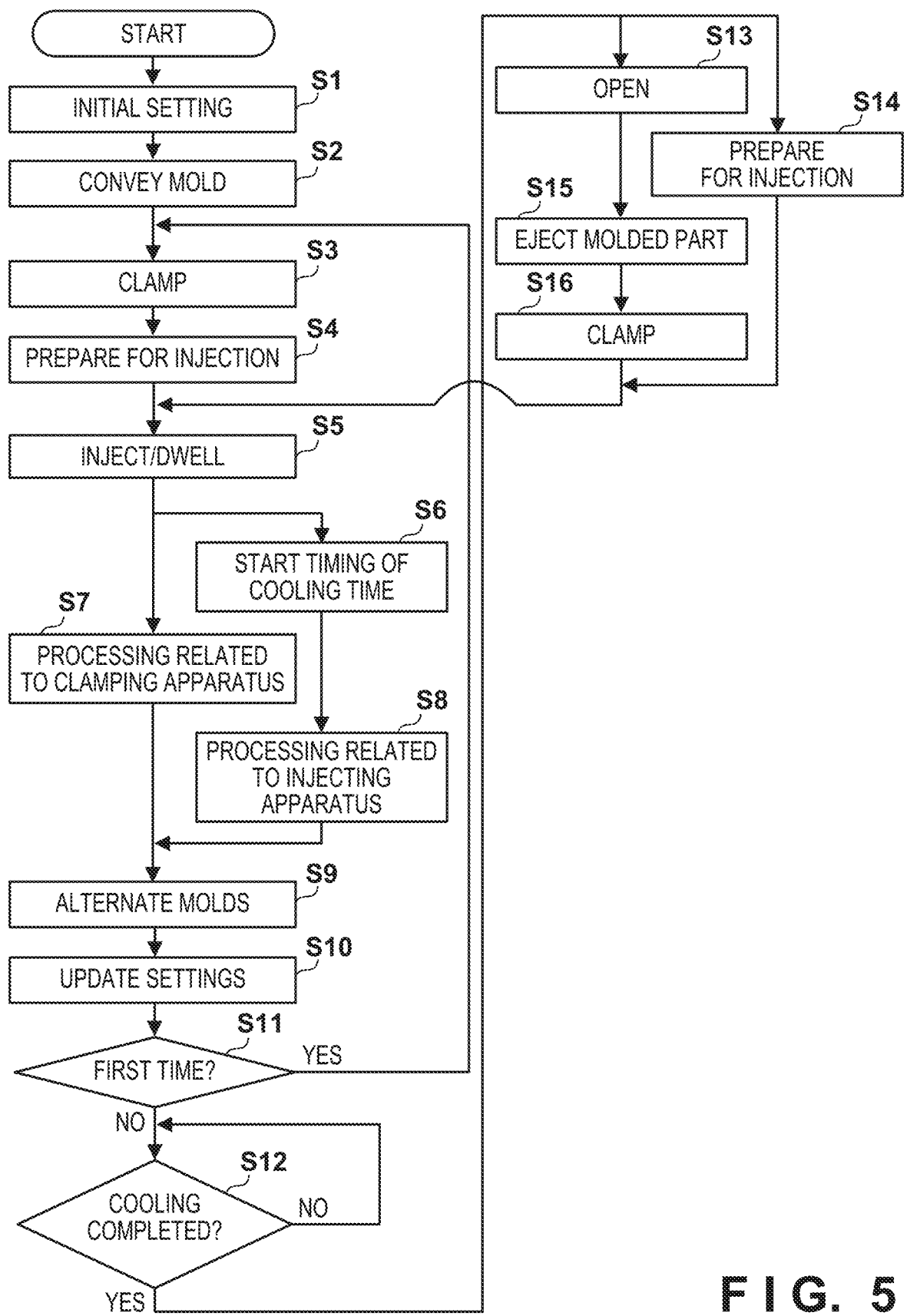
FIG. 5 is a flowchart for describing an example of processing of a control apparatus.

Explanation is given for an example of operation of the injection molding system 1. FIG. 5 is a flowchart for describing an example of processing that the controller 41 executes. FIG. 6 to FIG. 11 are views for describing examples of operation of the injection molding system 1. Each step in the processing example of FIG. 5 is explained with reference to respective states in FIG. 6 to FIG. 11. In the following example, a case in which a molding operation is performed while alternating the molds 100A and 100B as in molding using the mold 100A—molding using the mold 100B—molding using the mold 100A . . . is envisioned.

An initial setting is performed in step S1 of FIG. 5. Here, for each of the metallic molds 100A and 100B, operation conditions of the injecting apparatus 5 and the clamping apparatus 6 are registered. For example, these are the amount of resin that is injected in one time, the temperature, the injection speed, the clamping force, the initial value of the position of the movable platen 63 in relation to the tie-bars 64, and the like. These conditions may differ even when the mold 100A and the mold 100B are the same. Because the mold 100A is used for the first molding operation, firstly, the conditions related to the mold 100A are automatically set as operation conditions. Also, heating of the injection cylinder 51 and plasticizing and measuring of the resin and the like for the first time is started.

Figure 6:
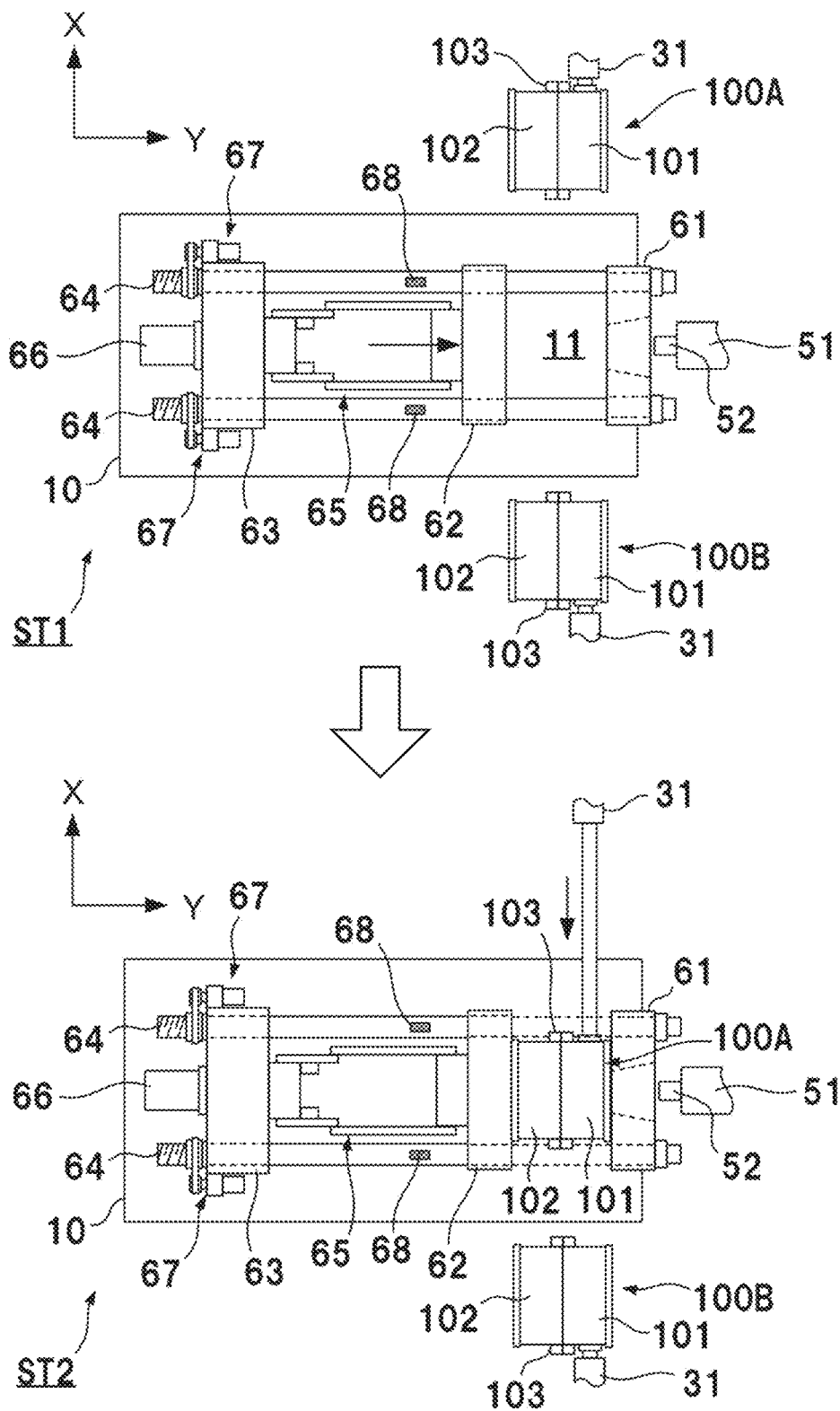
FIG. 6 is an explanatory view for describing an example of operation of the injection molding system.

In step S2 of FIG. 5, the mold 100A is conveyed into the injection molding machine 2. FIG. 6 illustrates this operation. Firstly, the motor 66 is driven to cause the space between the fixed platen 61 and the movable platen 62 to become slightly wider than the thickness of the mold 100A (the width in the Y direction) as illustrated in the state ST1. Next, the controller 41 transmits an instruction to load the mold 100A to the controller 42A, and the controller 42A drives the conveyance unit 31 to load the mold 100A into the molding operation position 11. When loading completes, a signal indicating load completion is transmitted from the controller 42A to the controller 41. When the signal indicating load completion is received, the motor 66 is driven to cause the fixed platen 61 and the movable platen 62 to closely contact with the mold 100A. At this time, it is not necessary to cause a clamping force as is caused to occur during molding to occur. Also, the mold 100A is locked to each of the fixed platen 61 and the movable platen 62 by driving the fixing mechanisms 610.

Figure 7:
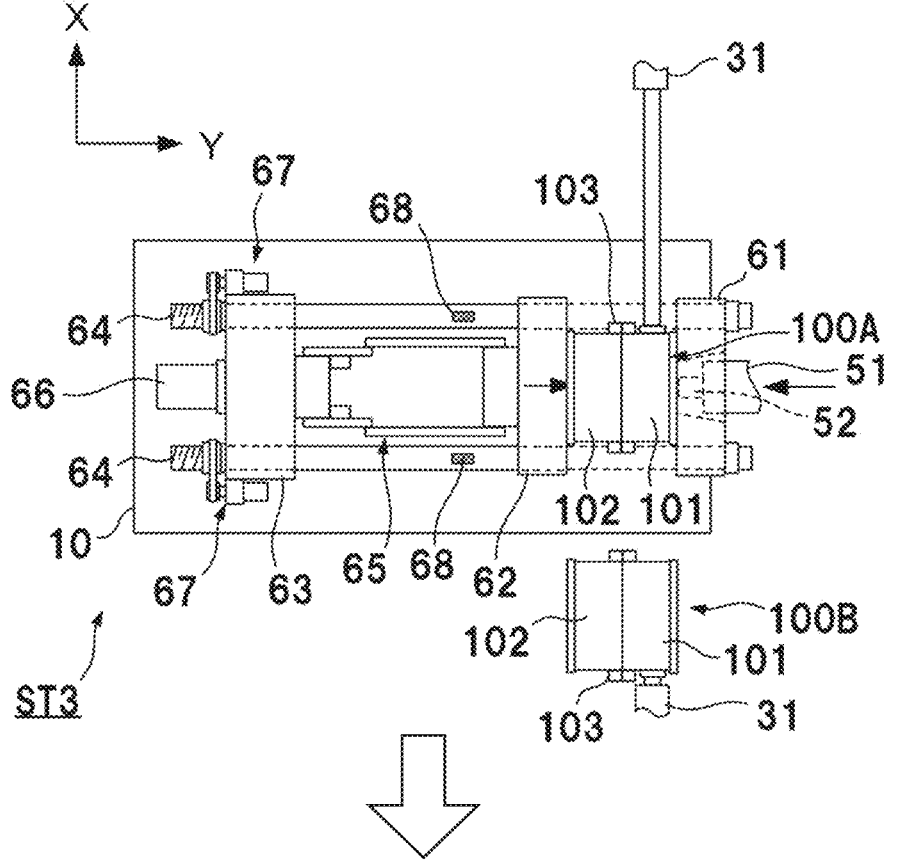
FIG. 7 is an explanatory view for describing an example of operation of the injection molding system.
Figure 7:
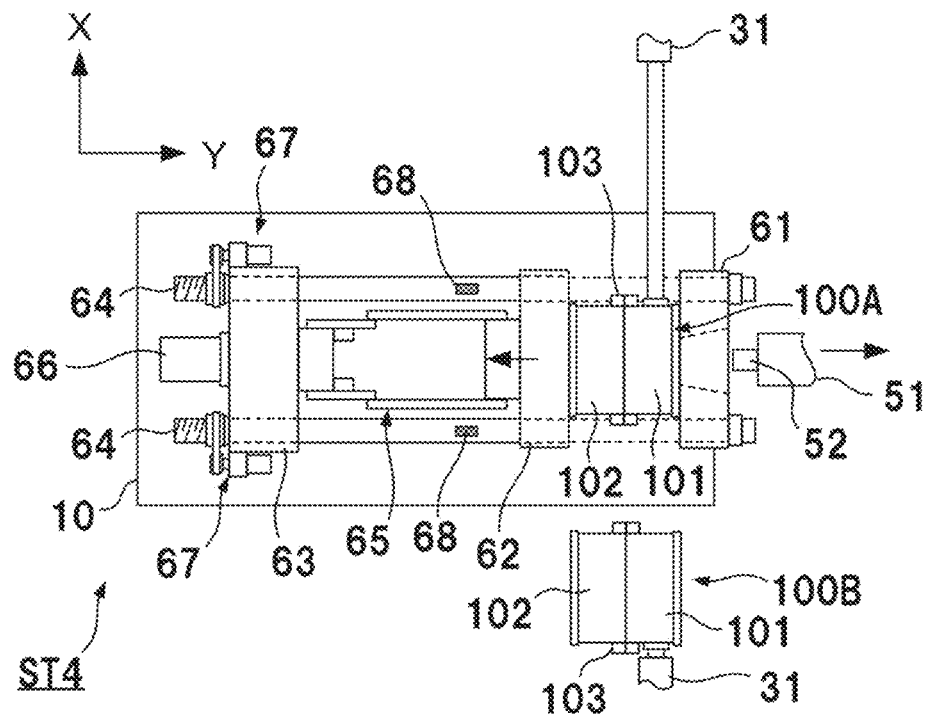

In step S3 of FIG. 5, clamping of the mold 100A by the fixed platen 61 and the movable platen 62 is performed by driving the motor 66 to drive the toggle mechanism 65. In step S4 of FIG. 5, preparation for injection in relation to the mold 100 is performed. Here, the actuator 55 is driven to move the injecting apparatus 5, causing the nozzle 52 to touch the mold 100A. The state ST3 of FIG. 7 illustrates these operations.

In step S5 of FIG. 5, injection and dwelling of molten resin is performed. In detail, the injecting apparatus 5 is driven to fill molten resin into a cavity in the mold 100A from the nozzle 52, and furthermore to press the resin in the cylinder 51 into the mold 100A at a high pressure in order to compensate for a volume decrease due to resin solidifying. Upon the processing of step S5, the actual clamping force is measured by the sensor 68. During molding, the mold 100A thermally expands due to the temperature of the mold 100A gradually rising, and there are cases where a difference arises in the initial clamping force and the clamping force after some time has passed. Accordingly, it is possible to correct the clamping force at the time of the next clamping based on a result of measurement by the sensors 68. The adjustment of the clamping force is performed by an adjustment of the position of the movable platen 63 in relation to the tie-bar 64 by driving the motor 67. In this way, it is possible to enhance precision of the clamping force by adjusting the clamping force by correcting the initial value of the position of the movable platen 63 in relation to the tie-bars 64 in accordance with the result of measurement by the sensors 68. The adjustment of the position of the movable platen 63 in relation to the tie-bars 64 may be performed at any timing (for example, at the timing of any of step S7, step S9, step S13-step S15 or the like in the flowchart of FIG. 5).

Next, the processing of step S6 to step S8 of FIG. 5 is performed in parallel. In step S6 of FIG. 5, timing of the time for cooling the molded part in the mold 100A is started. In step S7, processing related to the clamping apparatus 6 is performed. Firstly, locking of the mold 100A by the fixing mechanism 610 is released. Also, after a delay of a predetermined time from step S5, the motor 66 is driven to drive the toggle mechanism 65. With this, the clamping force vanishes, and the movable platen 62 is caused to separate slightly in relation to the fixed platen 61, and a space by which it is possible to alternate the molds is formed. The state ST4 of FIG. 7 illustrates a state in which the movable platen 62 is caused to separate slightly in relation to the fixed platen 61.

In step S8 of FIG. 5, processing related to the injecting apparatus 5 is performed. Here, for example, a dwelling suck back, a nozzle shut-off, a retraction of the injecting apparatus 5, a start of measurement of plasticization for the next injection or the like are performed. The state ST4 of FIG. 7 illustrates a state in which the injecting apparatus 5 is retracted (a state in which the nozzle 52 is retracted).

The dwelling suck back and the nozzle shut-off are for preventing the molten resin from dripping when the nozzle 52 separates from the mold 100A. These processes can be performed during a delay time prior to causing the movable platen 62 to separate slightly in relation to the fixed platen 61 in step S7. The dwelling suck back is for reducing a resin pressure in the injection cylinder 51 and in the molds 100 when after the dwelling the screw 51*a* is caused to retract. The position to which the screw 51*a* is retracted in the dwelling suck back may be managed as an absolute position, and may be managed as a relative position in relation to a position of the screw 51*a* after dwelling completion. Also, the screw 51*a* may be caused to retract until it is detected that the resin pressure that a load cell (not shown) installed in the injecting apparatus 5 measures is reduced to a predetermined pressure. The nozzle shut-off is a closing of the discharge port 52*a* of the nozzle 52, and in the example of FIG. 2, closes the discharge port 52*a* by the pin 56*a*. By this kind of operation, it is possible to suppress leaking of resin. Also, it is possible to improve the precision of the measuring of the resin for the next injection. Note that by the foregoing processing, it is possible to prevent the resin from leaking, but since there are cases where long threadlike resin is generated between the mold 100 and the nozzle 52 due to the structure of the mold or the type of resin, an apparatus for shooting air into the nozzle 52 may be installed to prevent this.

Figure 8:
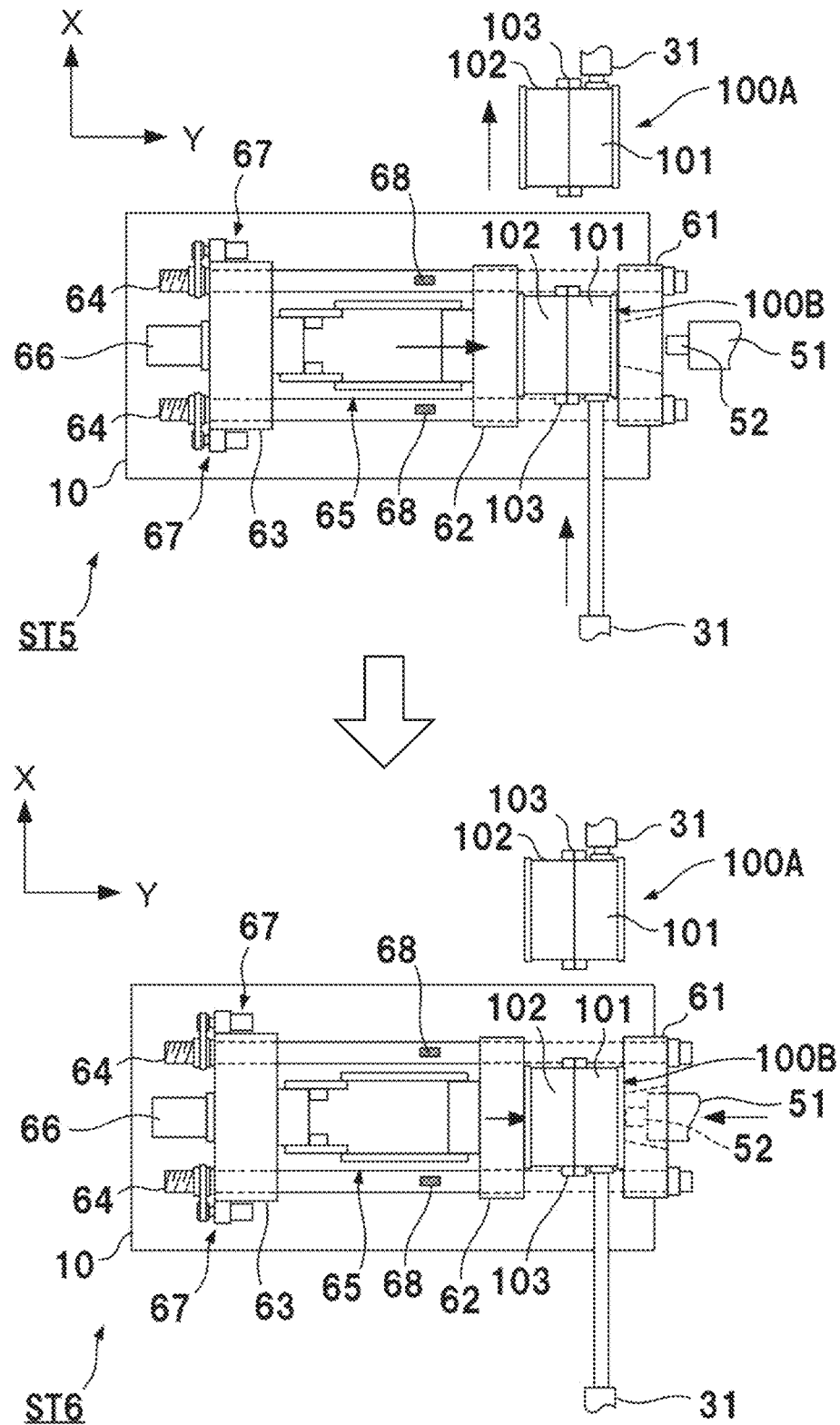
FIG. 8 is an explanatory view for describing an example of operation of the injection molding system.
Figure 9:
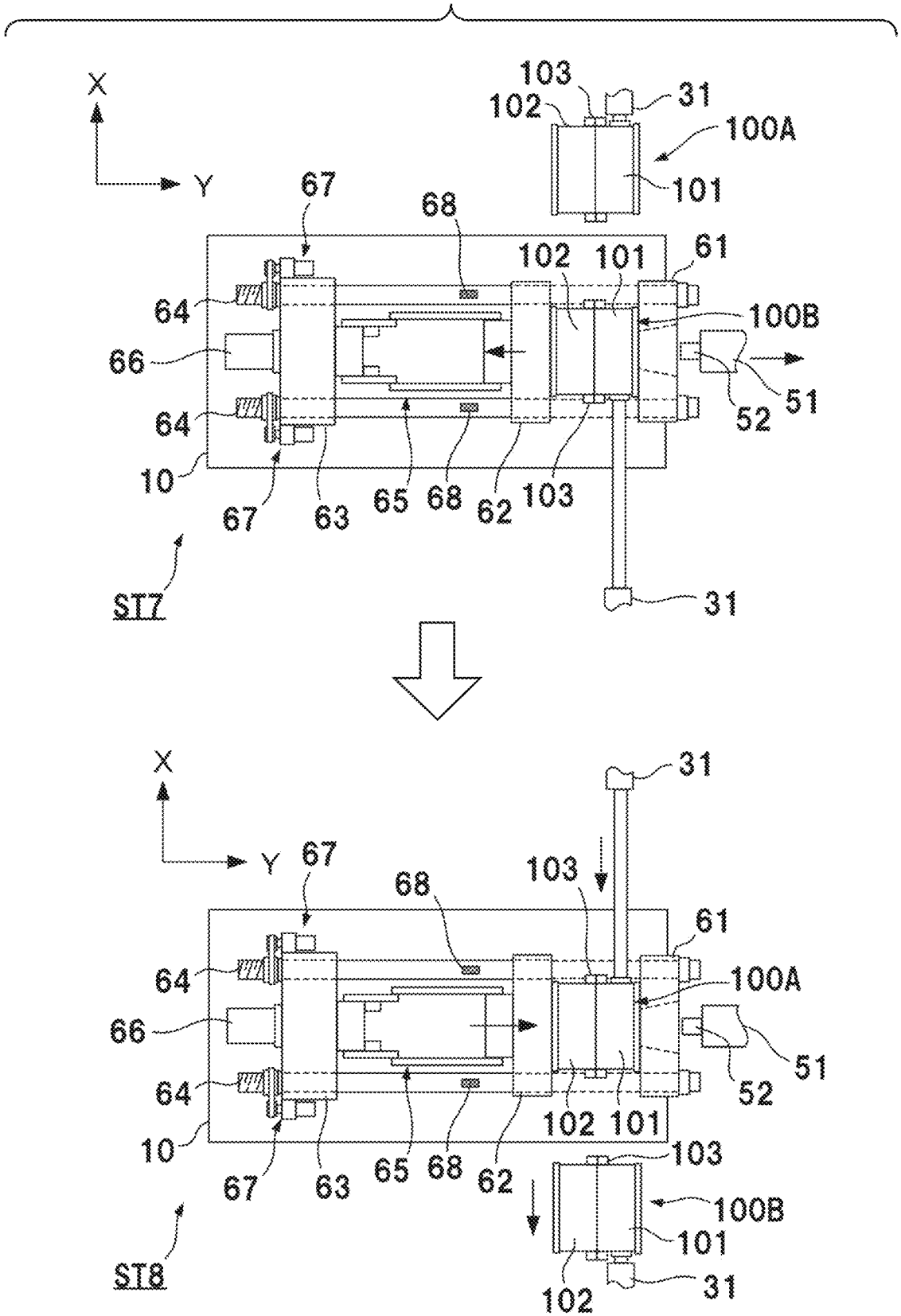
FIG. 9 is an explanatory view for describing an example of operation of the injection molding system.

In step S9 of FIG. 5, alternation of the molds 100 is performed. The state ST5 of FIG. 8 illustrates a state in which the molds 100 are alternated. Here, the mold 100A is unloaded from the molding operation position 11 to the conveying machine 3A, and the mold 100B is loaded from the conveying machine 3B to the molding operation position 11. The controller 41 transmits an instruction to unload the mold 100A to the controller 42A, and the controller 42A drives the conveyance unit 31 to unload the mold 100A from the molding operation position 11. When unloading completes, a signal indicating unload completion is transmitted from the controller 42A to the controller 41. The mold 100A is cooled on the conveying machine 3A. At this time, by the operation of the self-closing unit 103 the closed state of the mold 100A is maintained.

After unloading the mold 100A, or in parallel to the unloading, the controller 41 transmits an instruction to load the mold 100B to the controller 42B, and the controller 42B drives the conveyance unit 31 to load the mold 100B into the molding operation position 11. When loading completes, a signal indicating load completion is transmitted from the controller 42B to the controller 41.

When the signal indicating loading completion is received, conditions regarding the mold 100B are set as the operation conditions of the molding operation in step S10 of FIG. 5. For example, the thickness of the mold 100B (the width of the Y direction), the clamping force and the like are set as the operation conditions of the molding operation for this time. Also, molding conditions such as an injection speed or the like corresponding to the mold 100B is set. Furthermore, the motor 66 is driven to cause the fixed platen 61 and the movable platen 62 to closely contact with the mold 100B. At this time, it is not necessary to cause a clamping force as is caused to occur during molding to occur. Also, the mold 100B is locked to each of the fixed platen 61 and the movable platen 62 by driving the fixing mechanism 610.

Note that after step S9 in the embodiment, step S10 is performed, but because there are times where time is required for switching of the molding conditions, configuration may also be taken such that to switch the molding conditions simultaneously to the instruction to unload the mold 100A, for example.

In step S11, it is determined whether or not it is the first molding operation in relation to the molds 100A and 100B. In the case of the first molding operation, the process returns to step S3, and in the case or the second molding operation or greater, the process proceeds to step S12. In the flow explained above, it is the first molding operation, the process returns to step S3, and the processing of step S3 to step S8 is executed for the mold 100B. The state ST6 of FIG. 8 indicates the state of the processes of step S3 and step S4 for the mold 100B, and the state ST7 of FIG. 9 indicates the state of the processes of step S7 and step S8 for the mold 100B.

When the processing of step S3 to step S8 is executed for the mold 100B, the mold 100B is unloaded in step S9, and loading of the mold 100A is performed. The state ST8 of FIG. 9 indicates a state in which the mold 100B is unloaded, and the mold 100A is loaded. The mold 100B is cooled on the conveying machine 3B. In the determination of step S11, it is determined that it is not the first time, and the process proceeds to step S12.

In step S12, it is determined whether or not the cooling of the mold 100A completed based on whether or not the cooling time whose timing was started in step S6 has reached a predetermined time. In the case that the cooling completed, the processing of step S13 to step S16 and the processing of step S14 are performed in parallel.

Figure 10:
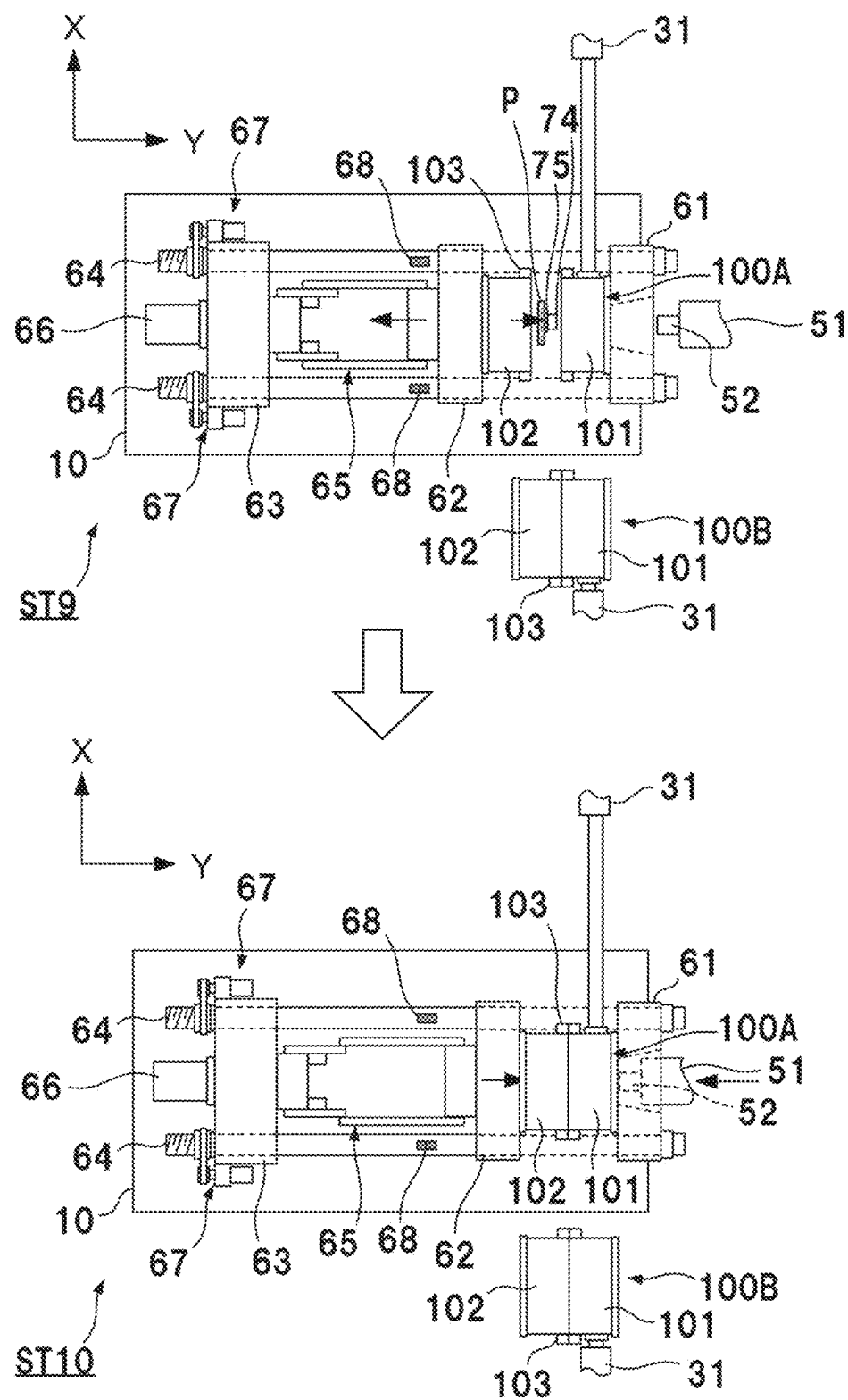
FIG. 10 is an explanatory view for describing an example of operation of the injection molding system.
Figure 11:
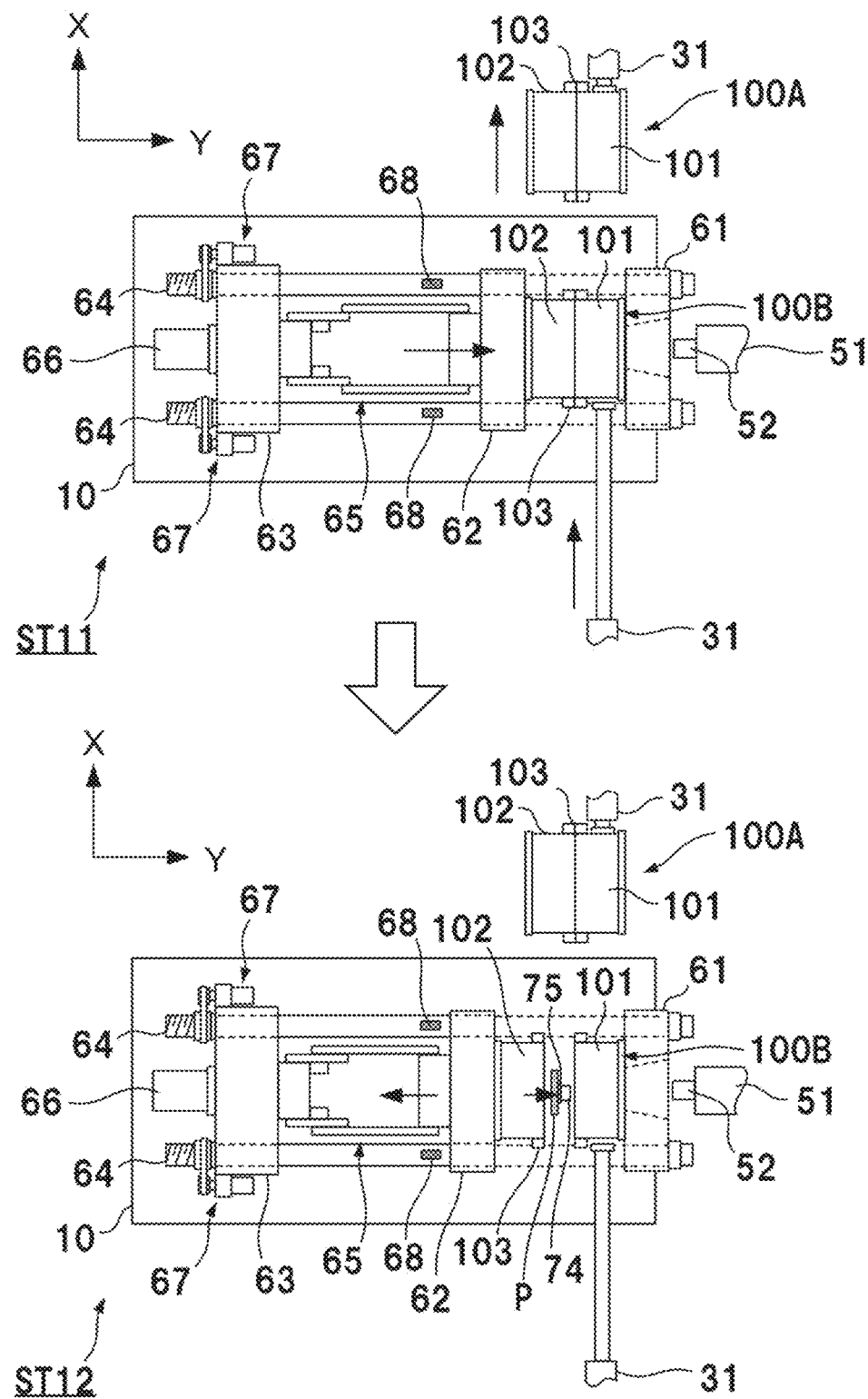
FIG. 11 is an explanatory view for describing an example of operation of the injection molding system.

In step S13, the movable platen 62 is separated from the fixed platen 61 by driving the motor 66. The fixed mold 101 is fixed to the fixed platen 61 by the fixing mechanisms 610, and the movable mold 102 is fixed to the movable platen 62 by the fixing mechanisms 610, and therefore the movable mold 102 separates from the fixed mold 101 and the mold 100A is opened against the magnetic force of the self-closing unit 103. The molded part remaining on the side of the movable mold 102 of the mold 100A is taken out by driving the take-out robot 7 in step S15, and conveyed to the exterior. The state ST9 of FIG. 10 illustrates operations for opening the mold 100A, and ejecting the molded part P. The vacuum head 74 is moved to a position at which the chuck plate 75 faces the molded part P, and the molded part P is held by suction.

In step S14, preparation for the next injection operation in relation to the mold 100A is performed. This is the same process as in step S4. In step S16, clamping of the mold 100A is performed. The state ST10 of FIG. 10 illustrates a state in which the mold 100A is clamped. After that, the process returns to step S5, and the same processing is repeated; the processing proceeds to injection/dwelling for the mold 100A—alternating the molds 100 (unloading of the mold 100A and loading of the mold 100B)—ejecting the molded part of the mold 100B. The state ST11 of FIG. 11 indicates a state of alternating the molds 100, and the state ST12 of FIG. 11 indicates a state of ejecting the molded part P from the mold 100B. After this, returning to the state ST5 of FIG. 8, the states ST5 to ST12 are repeated.

As described above, in the embodiment, cooling of the molds 100 is performed on the conveying machines 3A or 3B outside of the injection molding machine 2. Also, during cooling of one of the molds 100, each process of molded part ejection—clamping—injection/dwelling is performed by the injection molding machine 2 for the other of the molds 100. Because opening and molded part ejection are performed by the injection molding machine 2, the conveying machines 3A and 3B need not have a function for opening and a function for molded part ejection. Accordingly, it is possible to manufacture the molded part P while alternating the plurality of the molds 100A and 100B by the one injection molding machine 2 while suppressing cost of the system increases.

In particular, if the time required for all processes from the start of the mold replacement process, to the other mold ejecting process, injection process, and dwelling process, and up until completion of the mold replacement process once again fits into the time required for cooling one of the molds 100, then productivity compared to normal molding is improved by a maximum of two times. That is, in addition to suppressing cost increases, there is the merit that it is possible to realize high productivity.

Note that to realize twice the productivity, it is sufficient that the cooling time of the molds 100 cover 50% or more of the total molding process (the time for one molding cycle), but this depends on the time for the mold replacement process. Many molded parts used for exterior covering parts or electromechanical parts such as for automobiles, home electric appliances, office devices or the like, have a thickness of several millimeters to ensure strength. Accordingly, during the total molding process, the cooling process covers the longest time, and it is not uncommon for the time to cool the molds 100 to reach from 50% to 70% in relation to the time for one molding cycle. Accordingly, the foregoing embodiment is particularly effective in improving productivity of this type of molded part. The productivity can be particularly improved if the time for the molding cycle of the mold 100A and the time for the molding cycle of the mold 100B are about the same, and the time for cooling the molds 100 in relation to the time for one molding cycle is 50% or more.

Also, even if the thickness of the molded part is approximately 1 mm and is comparatively thin, there is the tendency for the cooling process to become longer in cases of parts for which high dimensional precision is required, or molded parts that use a resin for which a high temperature is required as a mold temperature, or a crystalline resin for which cooling is time consuming. In the foregoing embodiment, it is possible to realize close to two times the productivity in a wide range of molded parts.

Even if the time to cool the molds 100 is less than 50% of the time for one molding cycle, effective application of the time for cooling enables the realization of 1.5 times or 1.8 times higher productivity in relation to normal molding. Furthermore, by virtue of the foregoing embodiment, there is the effect that the installation space and the power consumption amount are reduced because it is possible to achieve the productivity of two injection molding machines by the conventional manufacturing method in the one injection molding machine 2.

Second Embodiment

The mold 100A and the mold 100B may be molds for molding the same molded part, or may be molds for molding different molded parts. Irrespective of whether or not the molded parts to be molded are the same, there are cases in which between the mold 100A and the mold 100B the thickness and clamping force in the Y direction differs, but in the embodiment, it is possible to change the position at which to fix the movable platen 63 in relation to the tie-bars 64 by the adjusting mechanisms 67, and a setting change (step S10 of FIG. 5) is performed after alternating the molds (step S9 of FIG. 5), and therefore it is possible to set clamping to correspond to each mold.

If the mold 100A and the mold 100B are molds for molding different molded parts, there are cases in which it is necessary to replace the chuck plate 75 with something that corresponds to the type of the molded part. However, when the chuck plate 75 is replaced, time is required regardless of whether it is done manually or automatically.

Figure 12:
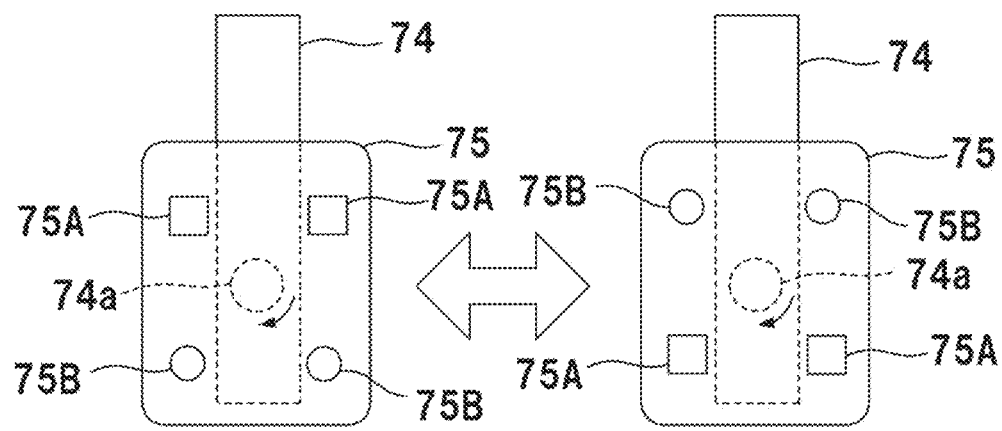
FIG. 12 is an explanatory view of a chuck plate of another example.
Figure 12:
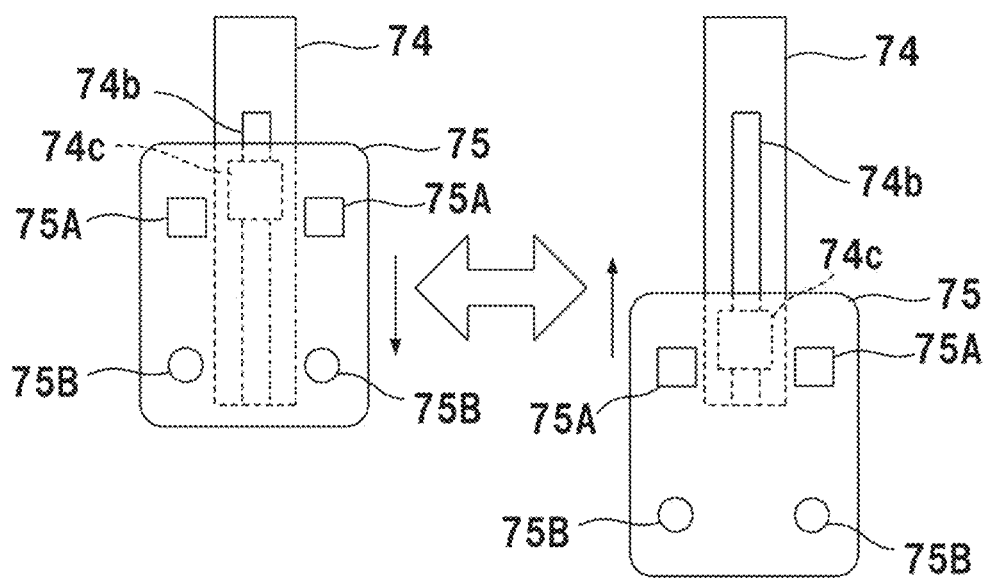

Accordingly, a chuck plate 75 which has holding portions corresponding to each of the differing molded parts may be used, and the chuck plate 75 may be caused to be displaced to cause the molded part to face the holding portion corresponding to the molded part in accordance with the mold 100 from which the molded part is ejected. FIG. 12 exemplifies two examples thereof.

EX1 of FIG. 12 indicates an example of the chuck plate 75. The chuck plate 75 includes a holding portion 75A and a holding portion 75B. The vacuum head 74 can cause the chuck plate 75 to rotate around an axis 74a, and can cause the chuck plate 75 to be displaced so that the positions of the holding portion 75A and the holding portion 75B change. With this, it is possible to switch the holding portion facing the molded part, and it is possible to handle different molded parts in a short time without replacing the chuck plate 75.

EX2 of FIG. 12 indicates another example of the chuck plate 75. The chuck plate 75 includes a holding portion 75A and a holding portion 75B. The vacuum head 74 includes a rail 74b and a slider 74c that moves along the rail 74b, and the chuck plate 75 is arranged on the slider 74c. By moving the slider 74c it is possible to cause the chuck plate 75 to be displaced to change the positions of the holding portion 75A and the holding portion 75B. With this, it is possible to switch the holding portion facing the molded part, and it is possible to handle different molded parts in a short time without replacing the chuck plate 75.

Note that it is possible to perform a change of an operation setting of the take-out robot 7 including this kind of displacement of the chuck plate in processing of step S10 of FIG. 5.

Third Embodiment

In the first embodiment, an example in which two molds 100A and 100B are alternated is explained, but three or more molds may be alternated. For example, a case in which three molds 100A-100C are alternated is explained. The mold 100A is loaded into the injection molding machine 2, and molded part ejection, clamping, and injection/dwelling is performed. The mold 100A is unloaded, the mold 100B is loaded into the injection molding machine 2, and molded part ejection, clamping, and injection/dwelling is performed. The mold 100B is unloaded, the mold 100C is loaded into the injection molding machine 2, and molded part ejection, clamping, and injection/dwelling is performed. The mold 100C is unloaded, the mold 100A is loaded into the injection molding machine 2, and molded part ejection, clamping, and injection/dwelling is performed. Thereafter, the same procedure is repeated. It is possible to employ as a conveyance apparatus of the three molds 100A-100C an apparatus that lines them up in the X direction and supports them by a common supporting body, and that includes an actuator for moving the supporting body in the X direction. In this example configuration, when the mold 100C is unloaded, and the mold 100A is loaded, the mold 100B passes inside the injection molding machine 2 temporarily.

Fourth Embodiment

It is possible to realize higher productivity by performing unloading and loading of the molds 100 in a shorter time. For this, employing a higher output unit as the conveyance unit 31 can be considered, but this becomes a cause of a cost increase. Accordingly, a balancer apparatus that supports movement of the molds 100 using gravity on weights may be arranged.

Figure 13:
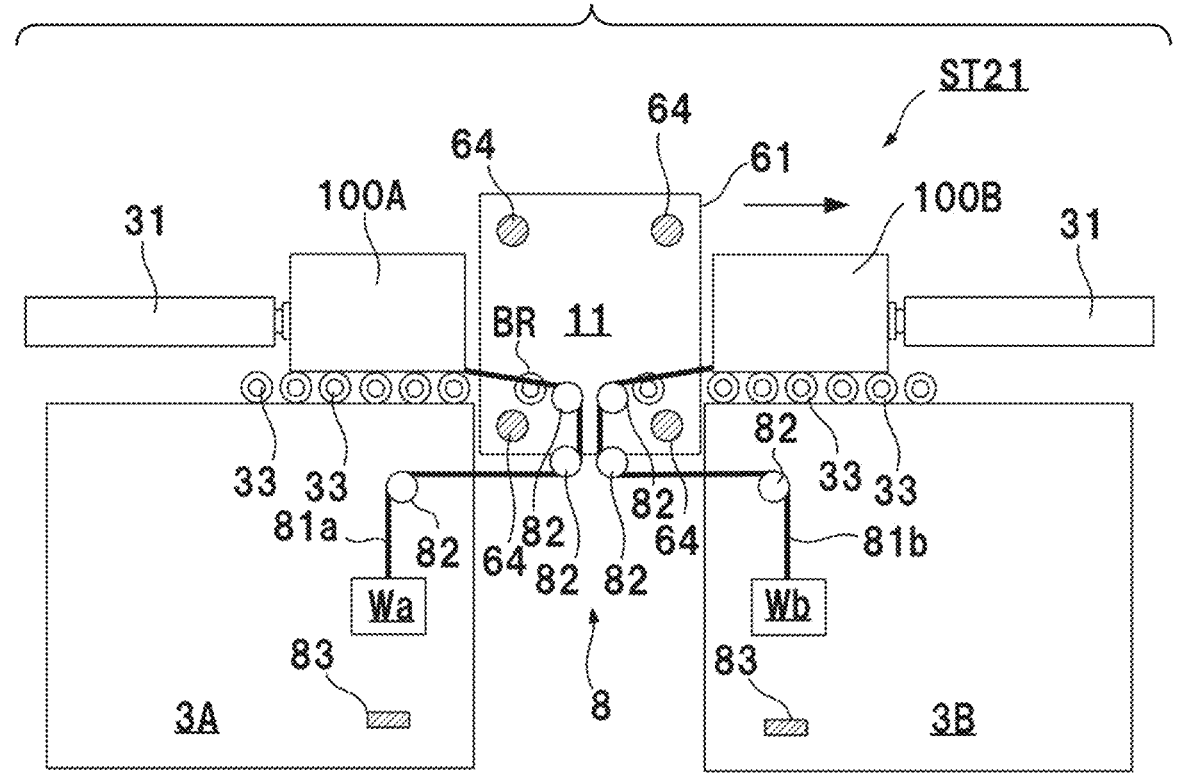
FIG. 13 is an explanatory view for describing an example of a balancer mechanism.
Figure 13:
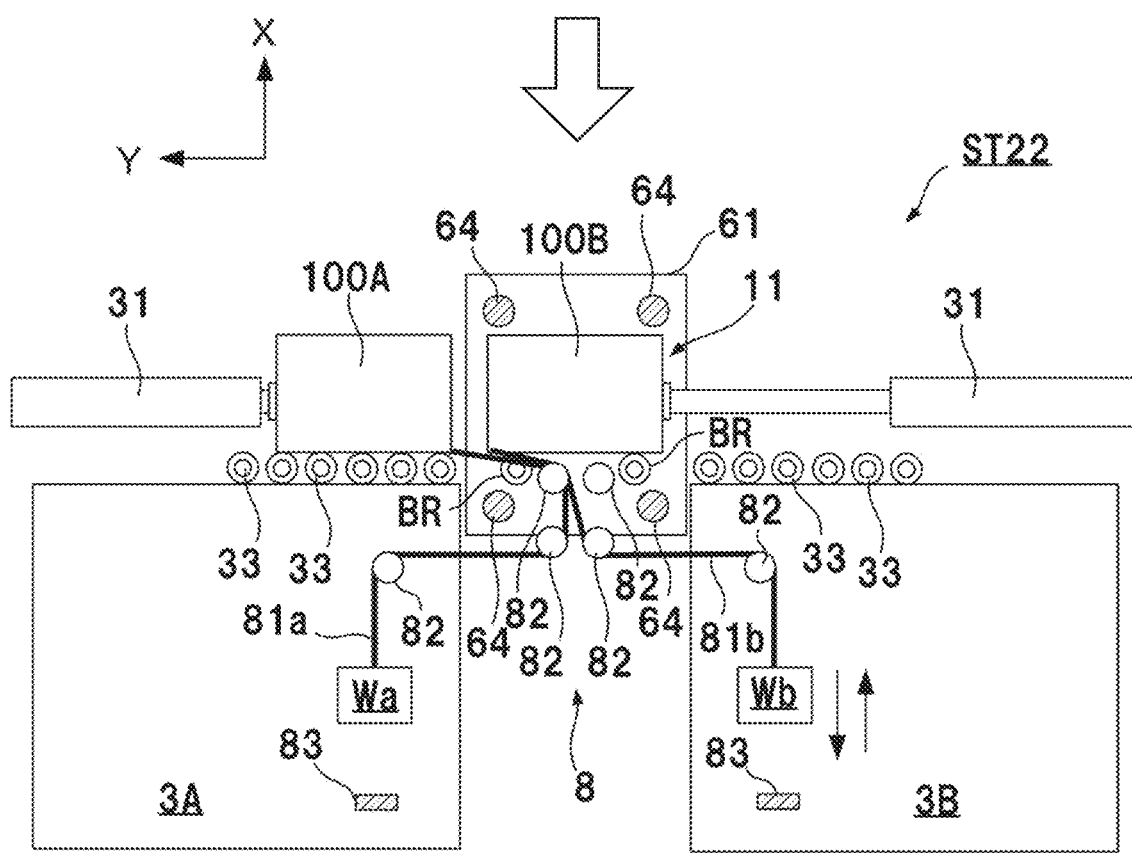

FIG. 13 illustrates an example of this. The state ST21 indicates a case in which the molds 100A and 100B are respectively positioned on the conveying machines 3A and 3B, and the state ST22 indicates a state in which the mold 100B is loaded onto the molding operation position 11.

A balancer apparatus 8 is arranged for each of two molds 100. The balancer apparatus 8 includes weights Wa and Wb, connecting members 81a and 81b, a plurality of rotation members 82, and a stopper 83. The connecting members 81a and 81b are line components such as chains or wires. The connecting member 81a connects the mold 100A and the weight Wa, and a connecting member 81b connects the mold 100B and the weight Wb. The rotation members 82 are components that are free to rotate and that support the connecting members 81a and 81b, and are, for example, rollers, sprockets, pulleys or movable pulleys. The stopper 83 defines a lower limit position of the weights Wa and Wb. The stopper 83 is arranged to stop the dropping of the weights Wa and Wb if the molds 100 reach an intermediate position between the molding operation position 11 and a position on the conveying machines 3A or 3B. The movement amount of the weights Wa and Wb (lowering amount) is half of the movement stroke of the molds 100 or less.

If the molds 100 are positioned on the conveying machines 3A or 3B or in the molding operation position 11, it is possible to stop the molds 100 by a brake mechanism of a servo motor of the conveyance unit 31. Upon loading or unloading of the molds 100, the brake mechanism is released. Then, the weight Wa or Wb drops, and movement of the mold 100 accelerates.

When the weight Wa or Wb reaches the stopper 83 in the middle of movement of the mold 100, then the mold 100 is made to be pulled, and the weight Wa or Wb is shifted to rise, which has the function of decelerating the mold 100. Accordingly, it is possible to reduce the driving force necessary for the conveyance unit 31 to cause the mold 100 to move.

A concrete example is explained. In FIG. 13, from the state ST21, the brake of the servo motor of the conveyance unit 31 of the conveying machine 3B is released. Then, the weight Wb is dropped from the initial position, and the mold 100B accelerates towards the molding operation position 11. When the weight Wb reaches the stopper 83 in the middle of movement of the mold 100B, then the mold 100 is made to be pulled, and the weight Wb is shifted to rise, which has the function of decelerating the mold 100. Then, when the mold 100B reaches the molding operation position 11, the brake of the servo motor of the conveyance unit 31 of the conveying machine 3B locks. With this, the mold 100B stops at the molding operation position 11. The weight Wb returns to the initial position or to a position close to the initial position.

The case where the mold 100B is unloaded from the molding operation position 11 to the conveying machine 3B is similar. The conveyance unit 31 can use gravity on the weight Wb at the stage of acceleration when movement of the mold 100B is started, and at the stage of decelerating when movement is stopped, and the driving force that is necessary can be reduced.

There are cases where a large load is produced on the connecting members 81a and 81b when the weights Wa and Wb reach the stopper 83, and are shifted from lowering to rising. In order to prevent breakage of the connecting members 81a and 81b or the plurality of rotation members 82 by this, a shock absorbing member (not shown) such as a damper, a spring or the like may be installed between the weights Wa and Wb and the stopper 83.

Fifth Embodiment

In the first embodiment, explanation is given of an example in which one injecting apparatus 5 is installed in the injection molding machine 2, but an injection molding machine 2 that has two or more of the injecting apparatus 5 may be used. In this method, it is not necessary to perform a change in the molding conditions in relation to the respective injecting apparatuses 5, and it is further possible to mold using materials of different types in the plurality of molds.

Sixth Embodiment

In the first embodiment, a generic injection molding method consisting of injection, dwelling, cooling, and ejecting processes for the molds 100 is applied, but publicly known molding techniques such as bubble molding, gas-assisted molding, heating and cooling molding for at least one mold may also be combined. Generally, such molding methods have a long cooling time, and therefore molding by combining these with the first embodiment is advantageous in that it causes productivity to improve.

Seventh Embodiment

During molding cycles, a temperature controller may be always connected to the mold 100 through a duct. The temperature controller controls the temperature of the mold 100 by, for example, circulating a fluid such as a cooling water through the mold 100 and the temperature controller. The temperature controller may be provided commonly for the mold 100A and the mold 100B, and the temperature controller may be provided for each mold, respectively. When the temperature controller is provided for each mold, respectively, each temperature of the molds 100A and 100B can be individually controlled.

Electric wires may be always connected to the mold during molding cycles. The electric wires may include wires for supplying electric power to a hot runner and the like and wires for transmitting signals from sensors such as a thermocouple, a limit switch and the like.

This application claims the benefit of Vietnamese Patent Application No. 1-2016-02505, filed Jul. 7, 2016 which is hereby incorporated by reference herein in its entirety.

What is claimed is:

1. An injection molding system comprising:
an injection molding machine which includes one injection nozzle for injecting a material into a first mold and alternately into a second mold on a molding operation position of the injection molding machine, wherein the first mold includes a first pair of molds and the second mold includes a second pair of molds;
the injection molding machine further including one mechanism for opening and closing the first pair of molds of the first mold and the second pair of molds of the second mold on the molding operation position of the injection molding machine alternately;
a first conveying machine configured to convey the first mold with a first molded part held between the first pair of molds on the molding operation position out of the molding operation position and to convey the first mold with the first molded part on the first conveying machine onto the molding operation position of the injection molding machine; and
a second conveying machine configured to convey the second mold with a second molded part held between the second pair of molds out of the molding operation position and to convey the second mold with the second molded part on the second conveying machine onto the molding operation position of the injection molding machine,
wherein the injection molding machine is configured to eject the first molded part from the first mold on the molding operation position and to eject the second molded part from the second mold on the molding operation position,
wherein the first mold includes a first self-closing unit to close the first pair of molds and the second mold includes a second self-closing unit to close the second pair of molds,
wherein the first conveying machine is configured to convey the first mold with the first self-closing unit on the molding operation position out of the molding operation position and to convey the first mold with the first self-closing unit on the first conveying machine onto the molding operation position of the injection molding machine, and wherein the second conveying machine is configured to convey the second mold with the second self-closing unit on the molding operation position out of the molding operation position and to convey the second mold with the second self-closing unit on the second conveying machine onto the molding operation position of the injection molding machine.

2. The injection molding system according to claim 1, wherein the first conveying machine is configured to convey the first mold in a first horizontal direction, and wherein the second conveying machine is configured to convey the second mold in a second horizontal direction.

3. The injection molding system according to claim 2, wherein the one injection nozzle is configured to move in a third horizontal direction orthogonal to the first and second horizontal directions.

4. The injection molding system according to claim 2, wherein the one mechanism includes a movable platen to which one of the first pair of the first mold and one of the second pair of the second mold is fixed alternately, and wherein the movable platen is configured to move in a fourth horizontal direction orthogonal to the first and second horizontal directions.

5. The injection molding system according to claim 2, wherein the first and second conveying machine are arranged so that a first distance between the first mold on the molding operation position of the injection molding machine and the second mold on the second conveying machine, and a second distance between the first mold on the first conveying machine and the second mold on the operation position of the injection molding machine are less than a third distance between the first mold on the first conveying machine and the second mold on the second conveying machine.

6. The injection molding system according to claim 1, further comprising a control apparatus configured to control the first conveying machine and the second conveying machine.

7. The injection molding system according to claim 6, wherein the first and second conveying machines are controlled by the control apparatus so that the first mold and the second mold are conveyed simultaneously.

8. The injection molding system according to claim 6, wherein the first and second conveying machines are controlled by the control apparatus so that the first mold and the second mold are conveyed not simultaneously.

9. The injection molding system according to claim 1, wherein the first pair of molds included in the first mold on the first conveying machine is a pair of a first fixed mold and a first movable mold, and the second pair of molds included in the second mold on the second conveying machine is a pair of a second fixed mold and a second movable mold, and wherein the one mechanism is configured to move the first movable mold in relation to the first fixed mold and to move the second movable mold in relation to the second fixed mold.

10. The injection molding system according to claim 1, wherein the first conveying machine and the second conveying machine are arranged laterally with respect to the injection molding machine.

11. The injection molding system according to claim 1, wherein the first conveying machine includes a first actuator that moves the first mold, wherein the second conveying machine includes a second actuator that moves the second mold, and wherein the system is configured to arrange the first mold and the second mold between the first actuator and the second actuator.

12. The injection molding system according to claim 1, wherein the first conveying machine includes a first plurality of rollers, wherein the second conveying machine includes a second plurality of rollers, wherein the injection molding machine includes a third plurality of rollers, wherein the first mold is conveyed on and contacts with the first plurality of rollers, and is conveyed on and contacts with the third plurality of rollers, and wherein the second mold is conveyed on and contacts with the second plurality of rollers, and is conveyed on and contacts with the third plurality of rollers.

13. The injection molding system according to claim 1, wherein the first conveying machine includes a first roller and a second roller separated from the first roller in a direction orthogonal to a conveying direction of the first conveying machine, and the first conveying machine is configured to convey the first mold between the first roller and the second roller, and wherein the second conveying machine includes a third roller and a fourth roller separated from the third roller in a direction orthogonal to a conveying direction of the second conveying machine, and the second conveying machine is configured to convey the second mold between the third roller and the fourth roller.

14. The injection molding system according to claim 1, further comprising a robot including a first holding portion for taking out the first molded part from the first mold, and a second holding portion for taking out the second molded part from the second mold.

15. The injection molding system according to claim 1, wherein each of a fixed platen and a movable platen in the injection molding machine is provided with a fixing mechanism which locks the first mold and the second mold to the fixed platen and the movable platen alternately releases the first mold and the second mold from the fixed platen and the movable platen alternately, and wherein the movable platen is configured to move in a fourth horizontal direction orthogonal to the first and second horizontal directions.

16. The injection molding system according to claim 1, wherein the one mechanism includes a fixed platen and a movable platen, and the molding operation position is a region between the fixed platen and the movable platen, wherein the first mold on the molding operation position is sandwiched between the fixed platen and the movable platen, and wherein the second mold on the molding operation position is sandwiched between the fixed platen and the movable platen.

17. The injection molding system according to claim 1, wherein each of the first conveying machine and the second conveying machine includes a fluid actuator.

18. The injection molding system according to claim 1, wherein each of the first conveying machine and the second conveying machine includes an electric actuator.

19. The injection molding system according to claim 1, wherein the injection molding machine is a horizontal type injection molding machine.

\* \* \* \* \*